(12) United States Patent
Keeling et al.

(10) Patent No.: US 9,698,608 B2
(45) Date of Patent: Jul. 4, 2017

(54) SYSTEM AND METHOD FOR MULTI-COIL DUAL BACKBONE DYNAMIC INDUCTIVE POWER TRANSFER

(71) Applicant: QUALCOMM Incorporated, San Diego, CA (US)

(72) Inventors: Nicholas Athol Keeling, Auckland (NZ); Mickel Bipin Budhia, Auckland (NZ); Chang-Yu Huang, Auckland (NZ); Michael Le Gallais Kissin, Jr., Auckland (NZ); Jonathan Beaver, Auckland (NZ); Claudio Armando Camasca Ramirez, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 14/584,667

(22) Filed: Dec. 29, 2014

(65) Prior Publication Data

US 2016/0190815 A1 Jun. 30, 2016

(51) Int. Cl.
*H01F 27/42* (2006.01)
*H02J 5/00* (2016.01)
(Continued)

(52) U.S. Cl.
CPC ............ *H02J 5/005* (2013.01); *B60L 5/005* (2013.01); *B60L 11/182* (2013.01); *H02J 7/025* (2013.01);
(Continued)

(58) Field of Classification Search
CPC . H02J 5/005; H02J 17/00; H02J 7/025; B60L 11/182; B60L 5/005
(Continued)

(56) References Cited

U.S. PATENT DOCUMENTS

2007/0182367 A1  8/2007  Partovi
2011/0184842 A1  7/2011  Melen
(Continued)

FOREIGN PATENT DOCUMENTS

GB  657036 A  9/1951
GB  2496436 A  5/2013
(Continued)

OTHER PUBLICATIONS

International Search Report and Written Opinion—PCT/US2015/063767—ISA/EPO—Feb. 24, 2016.

*Primary Examiner* — Jared Fureman
*Assistant Examiner* — Duc M Pham
(74) *Attorney, Agent, or Firm* — Knobbe, Martens, Olson & Bear LLP

(57) ABSTRACT

An apparatus for wirelessly transferring power to a receive coupler is provided. The apparatus comprises a first coupler connected to a second coupler. The apparatus further comprises a third coupler overlapping the first and second couplers. The apparatus further comprises a controller configured to receive power from at least one power supply, provide a first current to the first coupler and the second coupler in a first charging mode, and provide the first current to the first coupler and the second coupler and provide a second current to the third coupler in a second charging mode. A magnetic flux generated by the first current passing through a first portion is constructively additive with a magnetic flux generated by the first current passing through a second portion.

30 Claims, 14 Drawing Sheets

(51) Int. Cl.
*H02J 17/00* (2006.01)
*H02J 7/02* (2016.01)
*B60L 5/00* (2006.01)
*B60L 11/18* (2006.01)

(52) U.S. Cl.
CPC .......... *H02J 17/00* (2013.01); *Y02T 10/7005* (2013.01); *Y02T 10/7072* (2013.01); *Y02T 90/122* (2013.01); *Y02T 90/14* (2013.01)

(58) Field of Classification Search
USPC ...................................................... 307/104
See application file for complete search history.

(56) References Cited

U.S. PATENT DOCUMENTS

| | | |
|---|---|---|
| 2011/0198176 A1 | 8/2011 | Meins et al. |
| 2012/0055751 A1 | 3/2012 | Vollenwyder et al. |
| 2012/0098349 A1 | 4/2012 | Kim et al. |
| 2012/0326522 A1* | 12/2012 | Fukushima ............ H02J 5/005 307/104 |
| 2013/0119779 A1 | 5/2013 | Jung |
| 2013/0342942 A1 | 12/2013 | Wohlforth |
| 2014/0145810 A1 | 5/2014 | Park et al. |
| 2014/0225563 A1 | 8/2014 | Ichikawa et al. |
| 2014/0318912 A1 | 10/2014 | Woronowicz et al. |
| 2015/0077053 A1* | 3/2015 | Stamenic ............ H02J 7/0042 320/109 |
| 2016/0013661 A1* | 1/2016 | Kurs ...................... H02J 5/005 307/104 |

FOREIGN PATENT DOCUMENTS

| | | |
|---|---|---|
| JP | H08237890 A | 9/1996 |
| WO | WO-2013133255 A1 | 9/2013 |

* cited by examiner

SYSTEM AND METHOD FOR MULTI-COIL DUAL BACKBONE DYNAMIC INDUCTIVE POWER TRANSFER

FIELD

This application is generally related to wireless power charging of chargeable devices such as electric vehicles, and more specifically to systems and methods for multi-coil dual backbone dynamic inductive power transfer.

BACKGROUND

Chargeable systems, such as vehicles, have been introduced that include locomotion power derived from electricity received from an energy storage device such as a battery. Vehicles that are solely electric generally receive the electricity for charging the batteries from other sources. Battery electric vehicles are often proposed to be charged through some type of wireless charging system that is capable of transferring power in free space (e.g., via a wireless field). Some such systems may provide wireless power to the vehicle while the vehicle is located on the roadway, in motion or stationary. However, magnetics and circuit design for base pads within base array networks (BANs) of such wireless charging systems may be prohibitively expensive. Thus, there is a need for wireless charging systems having reduced component count, reduced number of inductive coils or couplers per meter of roadway, and reduced physical footprint of the base pads. Accordingly, systems and methods for multi-coil dual backbone dynamic inductive power transfer are desirable.

SUMMARY

According to some implementations, an apparatus for wirelessly transferring power to a receive coupler is provided. The apparatus comprises a first coupler connected to a second coupler. The apparatus comprises a third coupler overlapping the first coupler and the second coupler. The apparatus comprises a controller configured to receive power from at least one power supply. The controller is further configured to provide a first current to the first coupler and the second coupler in a first charging mode. A magnetic flux generated by the first current passing through a first portion of the first coupler is constructively additive with a magnetic flux generated by the first current passing through a second portion of the second coupler. The controller is further configured to provide the first current to the first coupler and the second coupler and provide a second current to the third coupler in a second charging mode.

In some other implementations, a method for wirelessly transferring power to a receive coupler is provided. The method comprises receiving power from at least one power supply. The method further comprises providing a first current to a first coupler and to a second coupler connected to the first coupler in a first charging mode. The method further comprises providing the first current to the first and second couplers and a second current to a third coupler that overlaps the first coupler and the second coupler in a second charging mode. A magnetic flux generated by the first current passing through a first portion of the first coupler is constructively additive with a magnetic flux generated by the first current passing through a second portion of the second coupler.

In yet some other implementations a non-transitory computer-readable medium is provided. The medium comprises code that, when executed, causes an apparatus to receive power from at least one power supply. The code, when executed, further causes the apparatus to provide a first current to a first coupler and to a second coupler connected to the first coupler in a first charging mode. The code, when executed, further causes the apparatus to provide the first current to the first and second couplers and a second current to a third coupler that overlaps the first coupler and the second coupler in a second charging mode. A magnetic flux generated by the first current passing through a first portion of the first coupler is constructively additive with a magnetic flux generated by the first current passing through a second portion of the second coupler.

In yet some other implementations, an apparatus for wirelessly transferring power to a receive coupler is provided. The apparatus comprises first means for wirelessly coupling power to a receive coupler. The apparatus comprises second means for wirelessly coupling power to the receive coupler. The first means is connected to the second means. The apparatus comprises third means for wirelessly coupling power to the receive coupler, the third means overlapping the first means and the second means. The apparatus comprises means for providing a first current to the first means and the second means in a first charging mode. A magnetic flux generated by the first current passing through a first portion of the first means is constructively additive with a magnetic flux generated by the first current passing through a second portion of the second means. The apparatus comprises means for providing the first current to the first means and the second means and provide a second current to the third means in a second charging mode.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Figure 1:
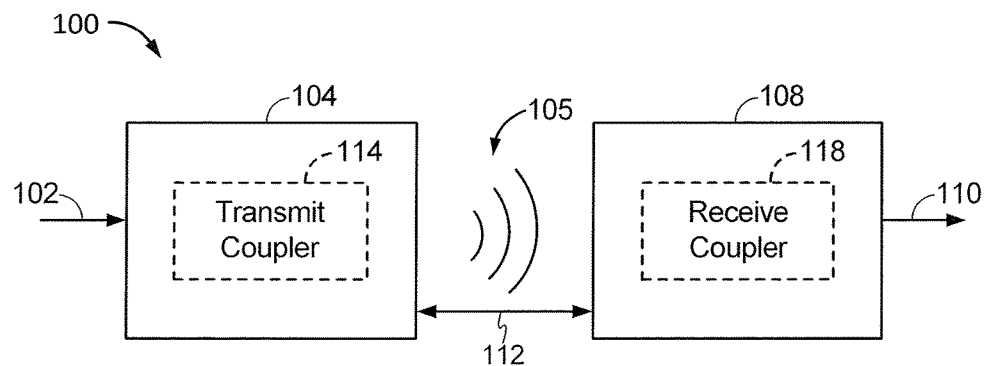
FIG. 1 is a functional block diagram of a wireless power transfer system, in accordance with an exemplary implementation.

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive coupler" to achieve power transfer.

An electric vehicle is used herein to describe a remote system, an example of which is a vehicle that includes, as part of its motion capabilities, electrical power derived from a chargeable energy storage device (e.g., one or more rechargeable electrochemical cells or other type of battery). As non-limiting examples, some electric vehicles may be hybrid electric vehicles that include a traditional combustion engine for direct locomotion or for charging the vehicle's battery in addition to electric motors. Other electric vehicles may draw all locomotive ability from electrical power. The electric vehicle is not limited to an automobile and may include motorcycles, carts, scooters, and the like. By way of example and not limitation, a remote system is described herein in the form of the electric vehicle (EV). Furthermore, other remote systems that may be at least partially powered using a chargeable energy storage device are also contemplated (e.g., electronic devices such as personal computing devices and the like).

The terminology used herein is for the purpose of describing particular implementations only and is not intended to be limiting of the disclosure. It will be understood that if a specific number of a claim element is intended, such intent will be explicitly recited in the claim, and in the absence of such recitation, no such intent is present. For example, as used herein, the singular forms "a," "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

FIG. 1 is a functional block diagram of a wireless power transfer system 100, in accordance with an exemplary implementation. An input power 102 may be provided to a transmitter 104 from a power source (not shown) to generate a time varying wireless (e.g., magnetic or electromagnetic) field 105 with a frequency corresponding to the resonant frequency of the transmit coupler 114 for performing energy transfer. A receiver 108 may couple to the wireless field 105 and generate an output power 110 for storing or consumption by a device (not shown in this figure) coupled to the output power 110. Both the transmitter 104 and the receiver 108 are separated by a distance 112.

In one example implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. However, even when resonance between the transmitter 104 and receiver 108 are not matched, energy may be transferred, although the efficiency may be affected. For example, the efficiency may be less when resonance is not matched. Transfer of energy occurs by coupling energy from the wireless field 105 of the transmit coupler 114 to the receive coupler 118, residing in the vicinity of the wireless field 105, rather than propagating the energy from the transmit coupler 114 into free space.

As such, wireless power transfer may be provided over a larger distance in contrast to purely inductive solutions that may require large couplers which are very close (e.g., within millimeters). Resonant inductive coupling techniques may thus allow for improved efficiency and power transfer over various distances and with a variety of inductive coupler configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near-field" of the transmitter 104 as will be further described below. The transmitter 104 may include a transmit coupler 114 for coupling energy to the receiver 108. The receiver 108 may include a receive coupler 118 for receiving or capturing energy transmitted from the transmitter 104. The near-field may correspond to a region in which there are strong reactive fields resulting from the currents and charges in the transmit coupler 114 that minimally radiate power away from the transmit coupler 114. The near-field may correspond to a region that is within about one wavelength (or a fraction thereof) of the transmit coupler 114.

As described above, efficient energy transfer may occur by coupling a large portion of the energy in the wireless field 105 to the receive coupler 118 rather than propagating most of the energy in an electromagnetic wave to the far field. When positioned within the wireless field 105, a "coupling mode" may be developed between the transmit coupler 114 and the receive coupler 118. The area around the transmit coupler 114 and the receive coupler 118 where this coupling may occur is referred to herein as a coupling-mode region.

Figure 2:
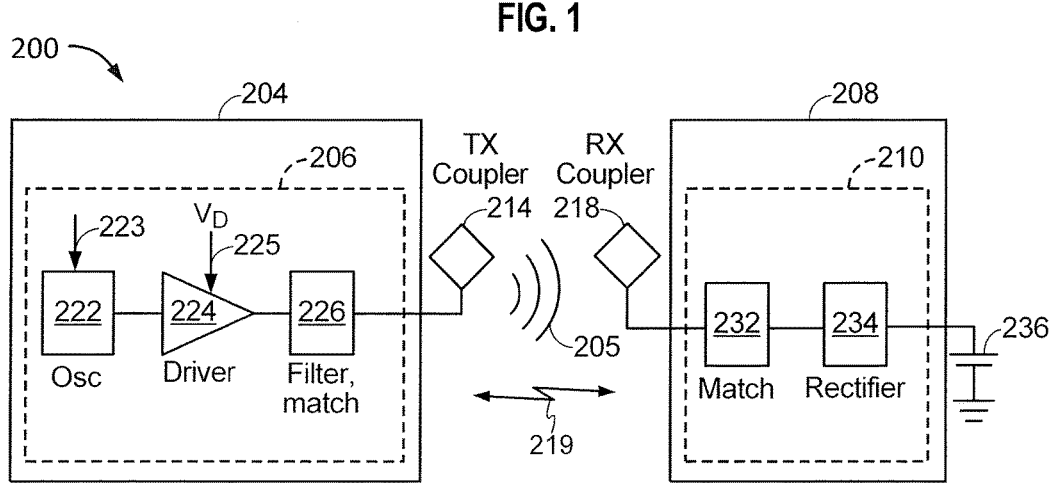
FIG. 2 is a functional block diagram of a wireless power transfer system, in accordance with another exemplary implementation.

FIG. 2 is a functional block diagram of a wireless power transfer system 200, in accordance with another exemplary implementation. The system 200 may be a wireless power transfer system of similar operation and functionality as the system 100 of FIG. 1. However, the system 200 provides additional details regarding the components of the wireless power transfer system 200 as compared to FIG. 1. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit coupler 214 at a resonant frequency of the transmit coupler 214 based on an input voltage signal ($V_D$) 225.

The filter and matching circuit 226 may filter out harmonics or other unwanted frequencies and match the impedance of the transmitter 204 to the transmit coupler 214. As a result of driving the transmit coupler 214, the transmit coupler 214 may generate a wireless field 205 to wirelessly output power at a level sufficient for charging a battery 236 of the electric vehicle 605, for example.

The receiver 208 may include a receive circuitry 210 that may include a matching circuit 232 and a rectifier circuit 234. The matching circuit 232 may match the impedance of the receive circuitry 210 to the receive coupler 218. The rectifier circuit 234 may generate a direct current (DC) power output from an alternate current (AC) power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205. In some implementations, the receiver 208 may be configured to determine whether an amount of power transmitted by the transmitter 204 and received by the receiver 208 is appropriate for charging the battery 236.

Figure 3:
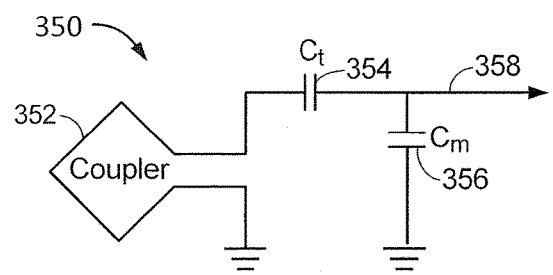
FIG. 3 is a schematic diagram of a portion of transmit circuitry or receive circuitry of FIG. 2 including a transmit or receive coupler, in accordance with an exemplary implementation.

FIG. 3 is a schematic diagram of a portion of the transmit circuitry 206 or the receive circuitry 210 of FIG. 2, in accordance with some exemplary implementations. As illustrated in FIG. 3, a transmit or receive circuitry 350 may include a coupler 352. The coupler 352 may also be referred to or be configured as a "conductor loop" 352 or as a "magnetic" coupler. The term "coupler" generally refers to a component that may wirelessly output or receive energy for coupling to another "coupler."

The resonant frequency of the loop or magnetic couplers is based on the inductance and capacitance of the loop or magnetic coupler. Inductance may be simply the inductance created by the coupler 352, whereas, capacitance may be added to the coupler's inductance to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. Accordingly, for larger sized couplers using large diameter couplers exhibiting larger inductance, the value of capacitance needed to produce resonance may be lower. Furthermore, as the size of the coupler increases, coupling efficiency may increase. This is mainly true if the size of both base and electric vehicle couplers increase. For transmit couplers, the signal 358, with a frequency that substantially corresponds to the resonant frequency of the coupler 352, may be an input to the coupler 352.

Many current wireless vehicle charging systems require the electric vehicle being charged to be stationary, i.e., stopped near or above the base coupler such that the electric vehicle maintains presence within the wireless field generated by the base coupler. Thus, while the electric vehicle is being charged by such a wireless charging system, the electric vehicle may not be used for transportation. Dynamic wireless charging systems that are capable of transferring power across free space may overcome some of the deficiencies of stationary wireless charging stations.

For example, the electric vehicle may travel along a roadway having a dynamic wireless charging system. The dynamic wireless charging system may comprise a plurality of the base couplers placed linearly along a path of travel.

The electric vehicle may request the dynamic wireless charging system activate the base couplers along the electric vehicle's path of travel. Such dynamic charging may also serve to reduce or eliminate the need for auxiliary or supplemental motor systems in addition to the electric locomotion system of the electric vehicle (e.g., a secondary gasoline engine of the hybrid/electric vehicle).

Figure 4:
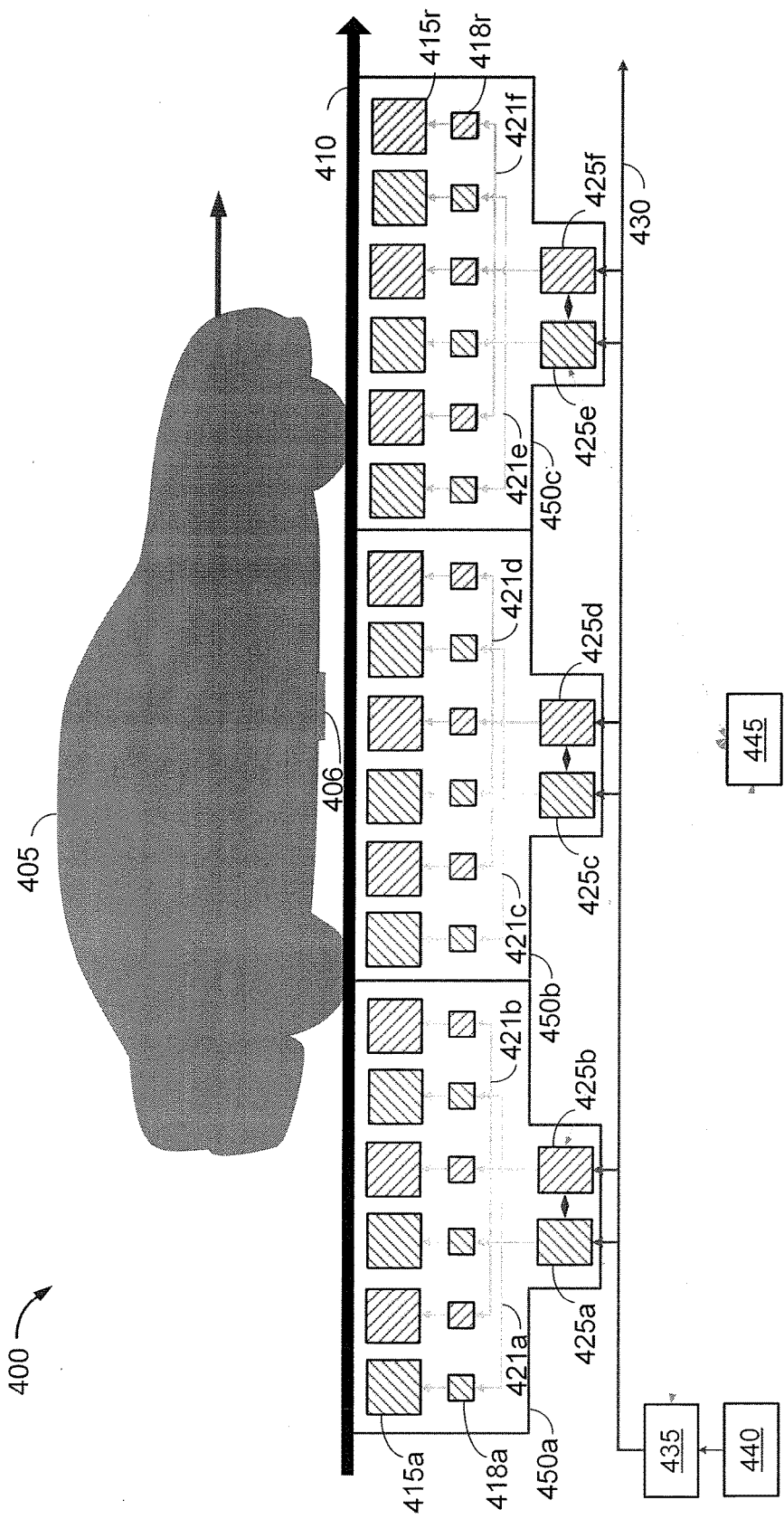
FIG. 4 illustrates a functional block diagram of an electric vehicle with at least one vehicle coupler in the presence of a wireless power transfer system, in accordance with an exemplary implementation.

FIG. 4 illustrates a functional block diagram of an electric vehicle 405 with at least one vehicle coupler 406 in the presence of a wireless power transfer system 400, in accordance with an exemplary implementation. As shown in FIG. 4, various components of a distribution network of a wireless power transfer system 400 are installed beneath, along or beside a roadway 410. The roadway 410 extends from the left side of FIG. 4 to the right side of FIG. 4, with a direction of travel of the electric vehicle 405 aligned with the roadway 410. The electric vehicle 405 may comprise at least one vehicle coupler 406, similar to the receivers 108/208, as previously described in connection with FIGS. 1 and 2, respectively. In some implementations, the at least one vehicle coupler 406 may comprise a polarized coupling system (e.g., a double-D coupler), a quadrature coupler system, combined double-D quadrature coupler system ("DDQ"), or any other system utilizing any other type or shape of coupler (e.g., circular, rectangular, or solenoid shaped couplers). A vehicle coupler 406 (secondary coupler) may couple with the magnetic field emitted by the primary coupler to receive flux. In some implementations, the vehicle coupler 406 (secondary coupler) may be selected to compliment the primary coupler(s) so as to couple with as much of the magnetic field to maximize the received flux. If the primary coupler is producing polarized (i.e., horizontal) flux, then a polarized type of vehicle coupler 406 may be used in the coupling system (e.g., a double-D coupler or a solenoid); alternatively, if the primary coupler is producing vertical flux, then a circular coupler or a quadrature coupler may be used. If the primary coupler is producing a combination of horizontal and vertical flux, then a combination vehicle coupler 406 may be used, e.g., a DDQ coupler. The "double-D" may refer to placing two D-shaped couplers back to back such that the overall shape of the coupler is round. A quadrature coupler may use four couplers as opposed to only two, in various geometries.

The dynamic wireless charging system 400 may comprise a plurality of base couplers 415a-415r installed in, on, beside, or flush with the roadway 410. Each of the plurality of base couplers 415a-415r may be configured to generate a wireless field (see the wireless field 205 of FIG. 2) for wirelessly transferring power to the electric vehicle 405 via the at least one vehicle coupler 406 when activated. Each of a plurality of switches 418a-418r may be configured to operationally connect a respective one of the base couplers 415a-415r to one of a plurality of local controllers 425a-425f via one of a plurality of distribution circuits 421a-421f. The local controllers 425a-425f may be configured to wirelessly receive power from a power supply/inverter 435, via an alternating current (AC) power backbone 430, and control an amount of power transferred to one or more of the plurality of base couplers 415a-415f via the switches 418a-418r. The power supply/inverter 435 may receive its power from a power source 440. The power source 440 and/or the power supply/inverter 435 may be sized based on a number of base couplers 415 to power, a number of local controllers 425, and/or a number and type of electric vehicles 405 to be charged. The power source 440 and power supply/inverter 435 may provide current at a frequency utilized by the base couplers 415 or, alternatively, at some higher or lower frequency. The AC power backbone 430 may comprise a loop conductor that distributes the high frequency (HF) power and may be capable of synchronizing the base couplers 415 and/or the local controllers 425 that are near each other to a single phase. Thus, the AC power backbone 430 may be considered a phase reference that also distributes power. Although only one power backbone 430 is shown, the present application additionally contemplates the use of multiple separate power backbones for powering different couplers within a particular BAN and/or for powering different BANs along the roadway.

A distribution controller 445 may be in communication with the power supply/inverter 435 and the local controllers 425a-425f and may be configured to provide global coordination of power control between the local controllers 425a-425f. Groups of the base couplers 415, the switches 418, and the local controllers 425 may comprise a series of individual Base Array Network (BAN) modules 450a-450c. The respective components of the BAN modules 450 are shaded to indicate respective common current paths.

As the electric vehicle 405 travels along the roadway 410, the distribution controller 445 may communicate with one or more of the electric vehicle 405, the power supply/inverter 435, and the local controllers 425a-425f to coordinate activation or deactivation of particular ones of the base couplers 415a-415r. For example, the distribution controller 445 may command the power supply/inverter 435 to generate a current and distribute the current to the AC power backbone 430. The AC power backbone 430 may utilize the distributed current to wirelessly supply power to the local controllers 425a-425f via a "double couple transformer" that wirelessly couples energy from the AC power backbone 430 and wirelessly couples energy to each of the respectively connected local controllers 425a-425f.

The local controllers 425a-425f may receive the power from the AC power backbone 430 and provide a regulated amount of current to one or more of the base couplers 415a-415r. In some implementations, the local controllers 425 in each BAN module 450 may comprise individual control units capable of independent control from each other. Alternatively, the local controllers 425 of each BAN module 450 may comprise a single, shared control unit or processor. The base couplers 415a-415r may generate wireless fields according to the current received via the respective switch 418a-418r from the local controller 425a-425f and may couple to the at least one vehicle coupler 406 to wirelessly transfer power to the electric vehicle 405.

Depending on the particular implementation, control of activation of the base couplers 415 may be shared to differing degrees between the distribution controller 445 and the local controllers 425a-425f. For example, in some implementations, the distribution controller 445 may coordinate the activation and deactivation of the base couplers 415a-415r and may coordinate any communications or actions between multiple BAN modules 450a-450c. In some other implementations, the distribution controller 445 may simply coordinate communications between the BAN modules 450a-450c or local controllers 425a-425f, while the local controllers 425a-425f may control the base coupler sequencing. In yet other implementations, the distribution controller 445 may activate a particular BAN module 450a-450c, but leave timing of the base coupler activations to the associate local controller(s) 425a-425f. In yet other implementations, the distribution controller 445 may communicate only non-critical information to the local controllers 425a-425f and not provide base coupler activation information.

Higher level coordination by the distribution controller 445, combined with the more localized current distribution and regulation at the local controllers 425a-425f may create a more responsive dynamic wireless charging system 400 with decentralized control via the local controllers 425a-425f. This may allow the local controllers 425a-425f to control current flow independently of the distribution controller 445 and allow local control of impedance matching and reactive voltage/amperage (VAr) loading. Such localized control may provide a decreased VAr load compensation response time since instructions need only come from the local controller 425a-425f and not from the distribution controller 445.

The distribution controller 445 may also obtain information regarding the velocity of the electric vehicle 405 for controlling activation of particular ones of the base couplers 415a-415r. The distribution controller 445 may obtain this information from the electric vehicle 405 or from various sensors or load analysis of the base couplers 415a-415r. In other implementations, each of the BAN modules 450a-450c may sense the presence of the electric vehicle 405 and autonomously and selectively activate the appropriate base couplers 415a-415r according to a detected presence or location of the electric vehicle 405. In yet other implementations, the BAN modules 450a-450c may receive a signal comprising information regarding the electric vehicle 405 velocity and/or position or an activation command from a neighboring BAN module. The received signal may come directly from the neighboring BAN module (e.g., a corresponding local controller 425) or via the distribution controller 445.

When a respective local controller 425 receives a signal from the distribution controller 445 to activate a specific base coupler 415, the respective local controller 425 may activate the switch 418 corresponding to the specific base coupler 415. As the vehicle 405 continues in the direction of travel, the local controllers 425a-425f may receive commands from the distribution controller 445 to activate or deactivate specific base couplers 415a-415r based on the position of the vehicle coupler 406. The local controllers 425a-425f may further control or regulate the current from the AC power backbone 430.

As depicted, the base couplers 415 from consecutive local controllers 425 may be interleaved or interlaced such that a single local controller 425 may provide power to alternating base couplers 415. Thus, the base couplers 415 from a first local controller 425 may be proximally interleaved with the base couplers 415 controlled by a second local controller 425 when the two local controllers 425 are within the same BAN 450. Thus, alternating base couplers 415 may be powered by different local controllers 425 and one local controller need not simultaneously power two adjacent base couplers 415. Additionally, preventing a single local controller 425 from providing current to consecutive or adjacent base couplers 415 may reduce power rating requirements of individual components, as each component need only be capable of handling the current load of a single base coupler 415 at a given time.

A wireless power transfer system having unbalanced reactive power loading may be able to transfer less power than a system having a balanced reactive power loading between the power source (e.g. the AC power backbone 430) and the load, or receiver (e.g., the base couplers 415). For example, unbalanced reactive power may result in thermal losses, voltage differences between the source and sink, and a decrease in voltage stability, among other factors. Accordingly, in some implementations, the local controllers 425a-425f may each comprise a tuning circuit or network to tune the current, and consequently the power, available to currently activated base coupler(s) 415. Such tuning circuits may allow for maintaining an optimum, or balanced VAr of the wireless charging system 400 within a small range (e.g., +/−5%) of the designed power tuning value.

In an exemplary dynamic wireless charging system, there may be a number of factors that impact the power supply tuning network. Certain systems may suffer from tuning capacitor aging. As a capacitor ages, the capacitive characteristics of the component may diminish. In an implementation, the AC power backbone 430 may vary in length, affecting the overall VAr loading of the system. In an implementation, various vehicle tuning topologies may affect the AC power backbone 430 VAr loading in different ways, reflecting different amounts of reactive power load back to the AC power backbone 430 (e.g., based on the vehicle charging system design).

In an implementation, the tuning circuit or network may be configured to function with only one base coupler 415 activated. In another implementation, the tuning circuit or network may be configured to function with multiple base couplers 415 being activated or be applied to one or more of the BANs 450a-450c. In another implementation, the tuning circuit or network may be configured to function with a single base coupler 415 or with multiple base couplers 415 being activated and receiving a current from a respective local controller 425.

FIG. 4 shows six base couplers 415 within each BAN 450a-450c. However, cost estimates for the magnetics/circuit design shown in FIG. 4 may be prohibitively expensive. Accordingly, the present application contemplates implementations where each BAN may comprise not six, but three coils, as will be described in more detail in connection with FIG. 5 below. This design may reduce component count, reduce the number of coils or couplers per meter of roadway charging apparatus, and may reduce the physical footprint of the BANs. This may have the additional benefits of reducing the installation costs as well as reducing the volume occupied by the BANs.

Figure 5:
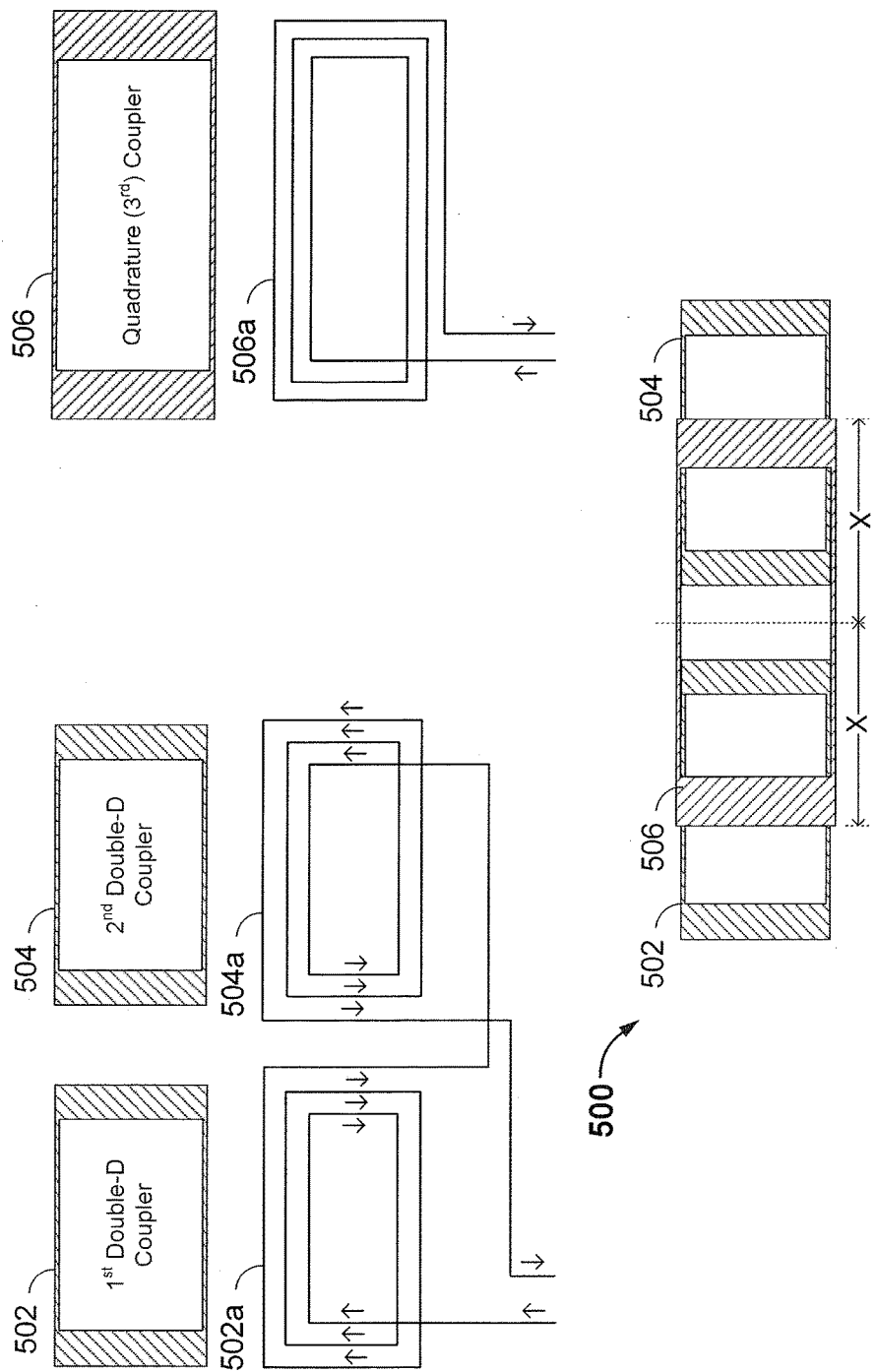
FIG. 5 shows a coupler arrangement of a base array network (BAN) for transmitting power wirelessly, in accordance with an exemplary implementation.

FIG. 5 shows a coupler arrangement 500 of a base array network (BAN) 500 for transmitting power wirelessly, in accordance with an exemplary implementation. The BAN may correspond to or replace any of the BANs 450a-450c, as previously described in connection with FIG. 4. The BAN 500 may comprise a first coupler 502 and a second coupler 504. The second coupler 504 may be disposed adjacent to but not overlapping the first coupler 502 (e.g., forming a double-D "DD" coupler). More specifically, a first portion of the first coupler 502 may be disposed adjacent to a second portion of the second coupler 504. The second coupler 504 may be connected in series and in anti-phase with the first coupler 502 (i.e., the same current that circulates through the first coupler 502 also circulates through the second coupler 504 and in the opposite direction as in the first coupler 502, e.g., clockwise versus counterclockwise as viewed from above, or vice versa, at any point in time). For example, as shown in FIG. 5, the first coupler 502 may comprise a plurality of conductor turns 502a. Likewise, the second coupler 504 may comprise a plurality of conductor turns 504a. One terminal of the first coupler 502 may be connected to an opposite terminal of the second coupler 504 such that current circulating through the first and second couplers circulates in the directions of the arrows, or the directions opposite the arrows. As shown, since the current circulating in adjacent portions of the conductors of the first coupler 502 and second coupler 504 travels in the same direction, the magnetic flux generated by the current will be constructively additive in the space between and above the first and second couplers 502 and 504 (e.g., at a receive coupler located in this space). This may also be the case between and above the first coupler 502 or the second coupler 504 of the BAN and a second coupler or a first coupler, respectively, of an adjacently disposed BAN (not shown) that is driven in the same fashion.

The BAN 500 may additionally comprise a third coupler 506 (e.g., a quadrature "Q" coil or coupler) disposed symmetrically over the first and second couplers 502 and 504 (e.g., equally overlapping the first and second couplers 502 and 504). The third coupler 506 may comprise a plurality of conductor turns 506a. Together, the first, second and third couplers 502/504/506 may form an "extended DDQ" coupler or BAN. Since the third coupler 506 is symmetrically disposed over the first and second couplers 502 and 504, and since the current circulates through the first and second couplers 502 and 504 in opposite directions, there is substantially zero net mutual coupling between either of the first and second couplers 502/504 and the third coupler 506. Moreover, since the first and second couplers 502 and 504 are series-anti-phase connected, there are essentially only two couplers to drive independently (i.e., 1) the first and second coupler pair 502/504 and 2) the third coupler 506). In some implementations, the BAN 500 may further include a ferromagnetic structure (not shown) disposed under the first, second and third couplers 502/504/506 and configured to channel or guide magnetic flux between and around the first, second, and third couplers 502/504/506. In some implementations, the BAN 500, including the first, second and third couplers 502/504/506, may have a width of approximately 400 mm, although the present application is not so limited. As will be described in more detail in connection with FIGS. 6 and 7 below, the first and second couplers 502/504 may be driven independently of the third coupler 506, by the same backbone power supply (see FIG. 6) or alternatively by corresponding separate backbone power supplies (see FIG. 7).

Figure 6:
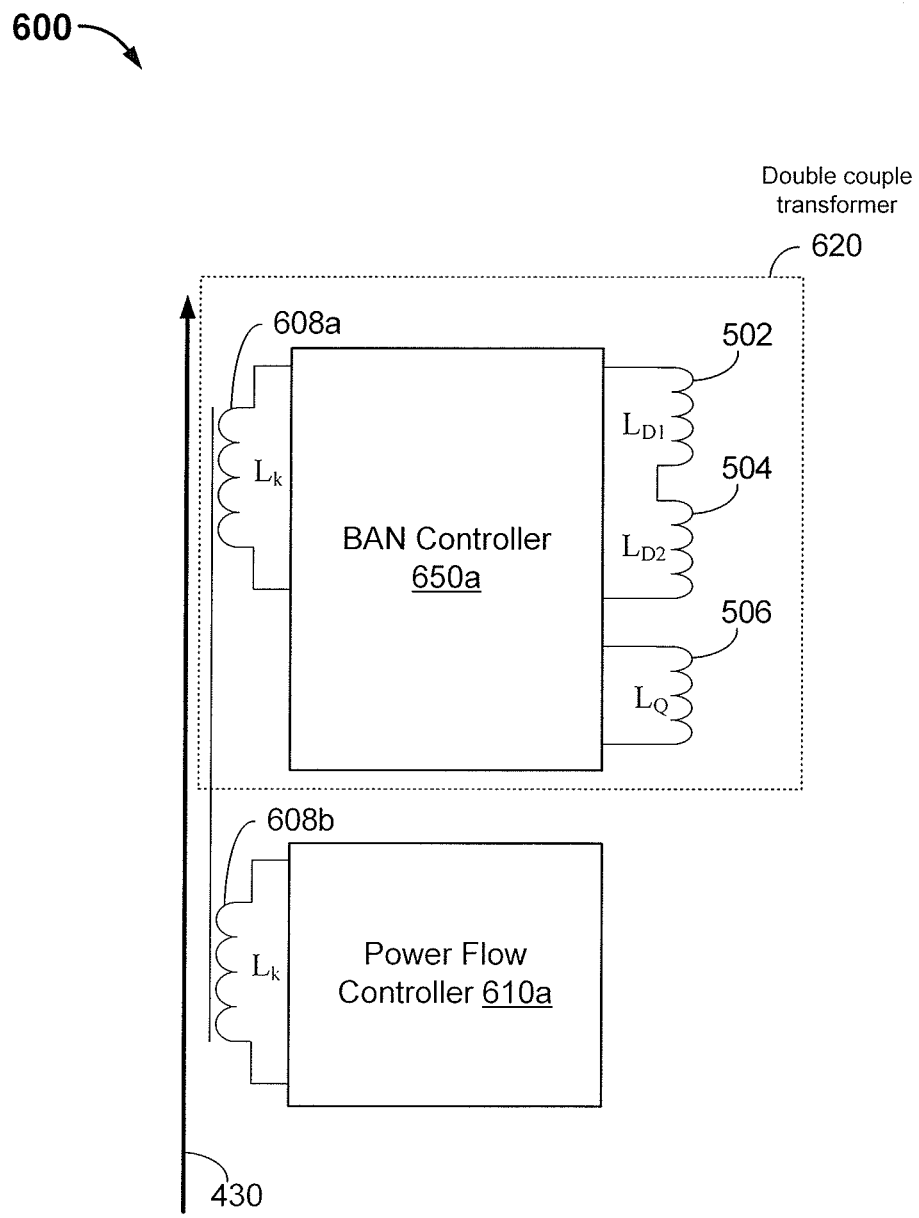
FIG. 6 shows a base array network (BAN) driven by a single power backbone, in accordance with an exemplary implementation.

FIG. 6 shows a base array network (BAN) 600 driven by a single power backbone, in accordance with an exemplary implementation. As shown in FIG. 6, the BAN 600 may comprise the AC power backbone 430 shown in FIG. 4 as well as a "double couple transformer" 620 configured to receive wireless power from the AC power backbone 430 and provide drive current to each of the first coupler 502, the second coupler 504 and the third coupler 506, as previously described in connection with FIG. 5. "Double couple," as used herein, generally relates to the notion that there are two wireless couplings associated with each double couple transformer: a first coupling between the backbone 430 and the double couple transformer 620 and a second coupling between the double couple transformer 620 and the vehicle coupler 406 (see FIG. 4), hence "double couple." The double couple transformer 620 may comprise at least one coupler 608a (e.g., a coil) configured to wirelessly couple with the AC power backbone 430 and receive wireless power therefrom. The double couple transformer 620 may then supply current and power, via the BAN controller 650a, to the first, second and third couplers 502, 504, and 506. The BAN controller 650a may be configured to drive the third coupler 506 separately from the series and anti-phase connected first and second couplers 502/504. The BAN controller 650a may additionally be configured to reverse a direction (e.g., polarity) or adjust a phase of drive currents supplied to the first and second couplers 502/504 and to the third coupler 506, based on a position and/or speed of a vehicle configured to receive wireless power from the BAN 600, or based on an amount of power, voltage or current drawn by one or more of the first and second couplers 502/504 or the third coupler 506, as will be described in more detail in connection with FIGS. 9A through 12G below.

The BAN 600 may further comprise a power flow controller 610a, which comprises at least one coupler 608b (e.g., coil) and is configured to relieve or substantially reduce transient voltage spikes in the components of the BAN controller 650a that may occur when current is abruptly switched ON or OFF or when a polarity or phase of the current is adjusted to one or more of the first and second couplers 502/504 or the third coupler 506 during operation by virtue of intrinsic inductances in the BAN 600. The power flow controller 610a may be configured to function as a shunt circuit for current previously travelling through the coupler 608a to now travel through the coupler 608b. This may be achieved by winding the couplers 608a and 608b on or around the same ferromagnetic structure as shown by the shared line adjacent to each of the couplers 608a and 608b (e.g., ensuring the couplers 608a and 608b are tightly mutually coupled to one another). In this way, the energy stored in the shared magnetic flux passing through the ferromagnetic structure may be shunted as induced current through the coupler 608b when operating conditions and current draw at the coupler 608a abruptly changes due to switching operations in the BAN controller 650a.

Figure 7:
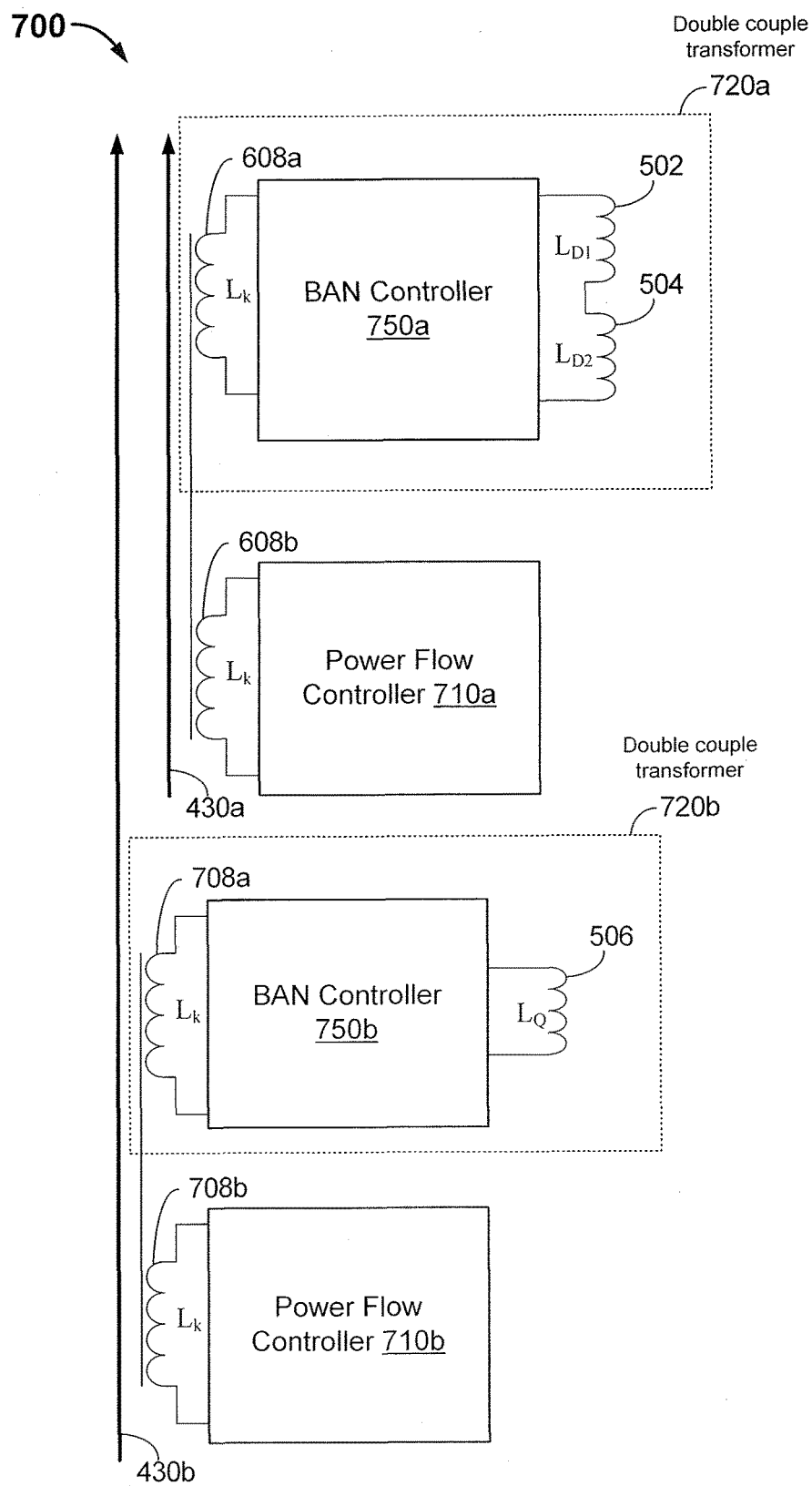
FIG. 7 shows a base array network (BAN) driven by two power backbones, in accordance with an exemplary implementation.

FIG. 7 shows a base array network (BAN) 700 driven by two power backbones, in accordance with an exemplary implementation. As shown in FIG. 7, the BAN 700 may comprise two AC power backbones 430a and 430b as those shown in FIG. 4. The BAN 700 may additionally comprise a first "double couple transformer" 720a configured to receive wireless power from the AC power backbone 430a and provide drive current to each of the first coupler 502 and the second coupler 504, as previously described in connection with FIG. 5. The double couple transformer 720a may comprise at least one coupler 608a (e.g., a coil) configured to wirelessly couple with the AC power backbone 430a and receive wireless power therefrom. The double couple transformer 720a may then supply current and power via the BAN controller 750a to the series and anti-phase connected first and second couplers 502 and 504. The BAN controller 650a may additionally be configured to reverse a direction (e.g., polarity) or adjust a phase of a drive current supplied to the first and second couplers 502/504, based on a position and/or speed of a vehicle configured to receive wireless power from the BAN 700, or based on an amount of power, voltage or current drawn by one or more of the first and second couplers 502/504, as will be described in more detail in connection with FIGS. 9A through 12G below.

The BAN 700 may further comprise a power flow controller 710a, which comprises at least one coupler 608b (e.g., coil) and is configured to relieve or substantially reduce transient voltage spikes in the components of the BAN controller 750a that may occur when current is abruptly switched ON or OFF or when a polarity or phase of the current is adjusted to one or more of the first and second couplers 502/504 during operation by virtue of intrinsic inductances in the BAN 700, as previously described in connection with FIG. 6.

The BAN 700 may additionally comprise a second "double couple transformer" 720b configured to receive wireless power from the AC power backbone 430b and provide drive current to the third coupler 506, as previously described in connection with FIG. 5. The second double couple transformer 720b may comprise at least one coupler 708a (e.g., a coil) configured to wirelessly couple with the AC power backbone 430b and receive wireless power therefrom. The second double couple transformer 720b may then supply current and power via the BAN controller 750b to the third coupler 506. The BAN controller 750b may additionally be configured to reverse a direction (e.g., polarity) or adjust a phase of a drive current supplied to the third coupler 506, based on a position of a vehicle configured to receive wireless power from the BAN 700, or based on an amount of power, voltage or current drawn by the third coupler 506, as will be described in more detail in connection with FIGS. 9A through 12G below.

The BAN 700 may further comprise a second power flow controller 710b, which comprises at least one coupler 708b (e.g., coil) and is configured to relieve or substantially reduce transient voltage spikes in the components of the BAN controller 750b that may occur when current is abruptly switched OFF or when a polarity or phase of the current is adjusted to the third coupler 506 during operation by virtue of intrinsic inductances in the BAN 700. Thus, in the BAN 700, the first and second couplers 502/504 (e.g., the "DD coils") are driven by a separate AC power backbone than the third coupler 506 (e.g., the "Q coil").

Figure 8:
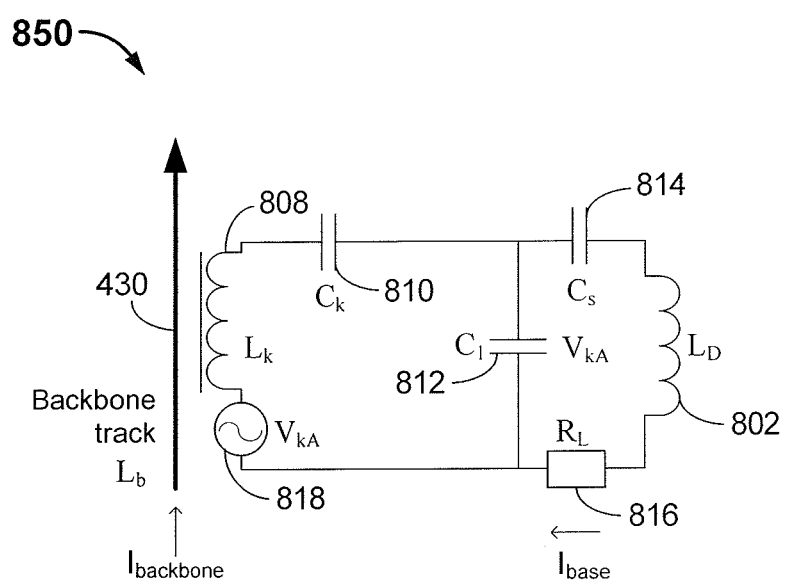
FIG. 8 shows an equivalent circuit diagram of portions of a BAN controller, in accordance with an exemplary implementation.

FIG. 8 shows an equivalent circuit diagram 850 of a BAN controller, in accordance with an exemplary implementation. The diagram 850 only includes those components required for an understanding of the voltage and currents present in the BAN controller as will be described below, and may have any number of additional components, switches, and/or arrangements of the described components. FIG. 8 shows the AC power backbone 430 of FIG. 4. The BAN controller may comprise a coil or coupler 808 connected in series with a series tuning capacitor 810 at one terminal, and to one terminal of an equivalent AC voltage source 818 at the other terminal. The equivalent voltage source 818 may provide a voltage having an amplitude and frequency that are equivalent to the voltage amplitude and frequency of a voltage induced in the coupler 808 by current circulating through the AC power backbone 430. A parallel tuning capacitor 812 may be connected in parallel across the other terminal of the series tuning capacitor 810 and the other terminal of the voltage source 818. An optional partial series capacitor 814 may be connected in series with a base pad coupler 802 and an equivalent load $R_L$ 816 representing the reflected load from a coupled vehicle coupler (e.g., vehicle coupler 406 of FIG. 4). This series connection of the capacitor 814, the coupler 802 and the equivalent load 816 may be connected in parallel with the parallel tuning capacitor 812.

As shown, a current in the AC power backbone 430 $I_{backbone}$ with respect to time, t, may be given by EQUATION 1 below:

$$I_{backbone} = I_A \sin(\omega t + \theta_A) \qquad \text{EQ. 1:}$$

where $I_A$ is the current magnitude, $\omega$ is the angular frequency of the backbone current in radian/sec, and $\theta_A$ is the phase angle of the current.

The induced voltage $V_{ka}$ in coupler 808 (e.g., the voltage source 818 voltage) may then be given by EQUATION 2 below:

$$V_{kA} = j\omega M_{kA} I_A \sin(\omega t + \theta_A) \qquad \text{EQ. 2:}$$

where j is $\sqrt{(-1)}$ and $M_{kA}$ is a mutual inductance between the AC power backbone and the coupler 808.

Due to complete series tuning, the voltage across $C_1$ is also equal to $V_{kA}$. In addition, since the reflected load of the vehicle coupler 406 when coupled to the coupler 802 is $R_L$, the equivalent base coil (coupler 802) impedance may be given by EQUATION 3 below:

$$Z_{LD} = j\omega L_{D1} + R_L \qquad \text{EQ. 3:}$$

where $L_{D1}$ is an inductance of coupler 802 and $R_L$ is the equivalent resistance of the vehicle coupler 406 in ohms (Ω).

If it is assumed that the magnitude of the impedance of the coupler 802 is equal to the magnitude of the impedance of the parallel tuning capacitor C1 and each is greater than 3 times the equivalent impedance of a coupled vehicle coupler (e.g., $\omega L_D = 1/(\omega C_1) > 3R_L$), the base coupler current $I_{base}$ may be considered to be substantially in phase with $V_{kA}$ and therefore in phase with backbone current $I_{backbone}$, as shown below according to equations 4 and 5:

$$I_{base} = V_{kA}/Z_{LD} = V_{kA}/(j\omega L_D + R_L) \approx V_{kA}/(j\omega L_D) \qquad \text{EQ. 4:}$$

$$I_{base} = (M_{kA}/L_D) I_A \sin(\omega t + \theta_A) \qquad \text{EQ. 5:}$$

FIGS. 9A, 9B, 9C, 9D, 9E, 9F and 9G illustrate an operation of the BAN 500 of FIG. 5 as a vehicle coupler 920 moves along the BAN 500, in accordance with an exemplary implementation. Each of FIGS. 9A-9G may describe a driving scheme for driving the first, second and third couplers 502/504/506 based on a position of the vehicle coupler 920 relative to the BAN 500. In some implementations, the first and second couplers 502/504 may be controlled by the same BAN controller as the third coupler 506, as previously described in connection with FIG. 6. In some other implementations, the first and second couplers 502/504 may be controlled by a different BAN controller than the third coupler 506, as previously described in connection with FIG. 7. With respect to FIGS. 9A-9G, the BAN controller(s) may reverse a polarity of current energizing the third coupler 506 at particular times or for particular positions of a receive coupler. However, the present application also contemplates instead reversing a polarity of current energizing the first and second couplers 502/504. Thus, any reversing of polarity is, in the broadest context, essentially reversing the polarity of the first and second couplers 502/504 with respect to the current polarity of the third coupler 506 or vice versa. In some implementations, the coupler(s) delivering the least amount of power to the receive coupler (or having the lowest level of coupling with the receive coupler) at the time a polarity reversal is to take place may have their polarity reversed. Although not necessarily always the case, the coupler delivering the least amount of power at the time of a desired polarity reversal will generally be the coupler located the farthest distance from the receive coupler. In addition, although exemplary polarities are shown by arrows in FIGS. 9A-9G, it is the relationship between the polarity of the current in the first and second couplers 502/504 with respect to the polarity of the current in the third coupler 506 that is most determinative. Thus, the directions of the arrows in FIGS. 9A-9G may be reversed from those shown.

Figure 9A:
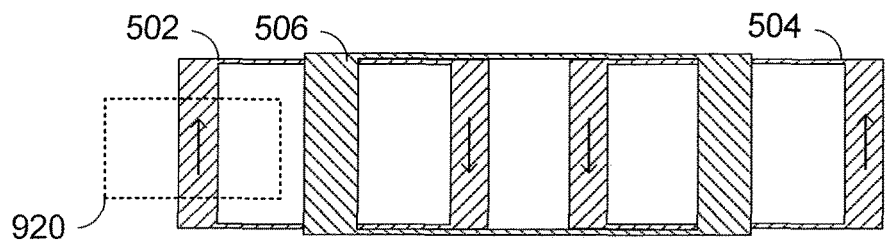
FIG. 9A illustrates an operation of the BAN of FIG. 5 as a vehicle coupler is in a first position and moves along the BAN, in accordance with an exemplary implementation.

FIG. 9A shows the vehicle coupler 920 in a first position, where the vehicle coupler 920 is located over the first coupler 502 but not over the second or third couplers. This illustrated first position may illustrate an entry position of the vehicle coupler 920 and may correspond to an "entry mode" of the BAN 500. When the vehicle coupler 920 is in the first position, the first and second couplers 502/504, being connected to one another in series anti-phase, may be energized with a first AC current having a first polarity as shown by the arrows. The third coupler 506 may not be energized.

Figure 9B:
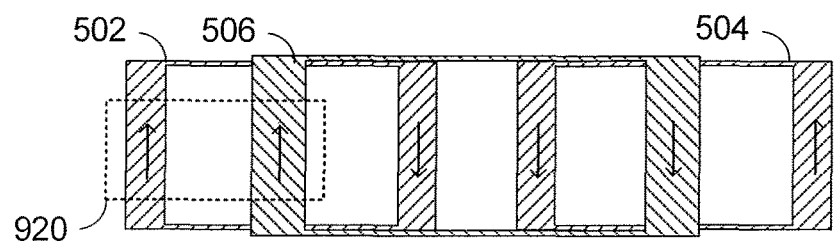
FIG. 9B illustrates an operation of the BAN of FIG. 5 as a vehicle coupler is in a second position and moves along the BAN, in accordance with an exemplary implementation.

FIG. 9B shows the vehicle coupler 920 in a second position, where the vehicle coupler 920 has advanced and is located over the first and third couplers 502/506. This second position may illustrate one of a plurality of different positions of the vehicle coupler 920 during a "traverse mode" of the BAN 500. When the vehicle coupler 920 is in the second position, the first and second couplers 502/504 may be or remain energized with the first AC current having the first polarity as shown by the arrows. The third coupler 506 may also be energized with an AC current having the first polarity, as shown by the arrows. Thus, in the second position, a current circulating in the first coupler 502 may circulated in a same direction as a current circulating in the third coupler 506. In this way, a horizontal magnetic flux (e.g., a magnetic flux flowing in the plane of the page of FIG. 9B) generated by the currents circulating in each of the first and third couplers 502/506 may be additive for the vehicle coupler 920 at the second position (e.g., the flux may have substantially the same polarity at any particular time while in substantially the second position).

Figure 9C:
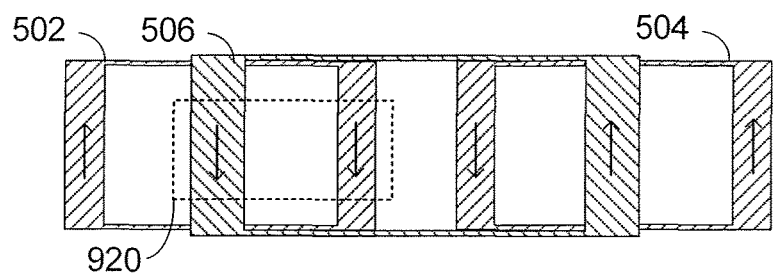
FIG. 9C illustrates an operation of the BAN of FIG. 5 as a vehicle coupler is in a third position and moves along the BAN, in accordance with an exemplary implementation.

FIG. 9C shows the vehicle coupler 920 in a third position, where the vehicle coupler 920 has advanced and is located over the first and third couplers 502/506. This third position may illustrate another of a plurality of different positions of the vehicle coupler 920 during the "traverse mode" of the BAN 500. When the vehicle coupler 920 is in the third position, the first and second couplers 502/504 may be or remain energized with the first AC current having the first polarity as shown by the arrows. The third coupler 506 may switch from being energized with an AC current having the first polarity, to being energized with an AC current having a second polarity opposite of the first polarity, as shown by the arrows. Thus, in the third position, a current circulating in the first coupler 502 may circulate in an opposite direction as a current circulating in the third coupler 506 such that horizontal magnetic flux generated by the currents flowing in portions of the first and third couplers 502/506 located under the vehicle coupler 920 in the third position are additive for the vehicle coupler 920 at the third position.

Figure 9D:
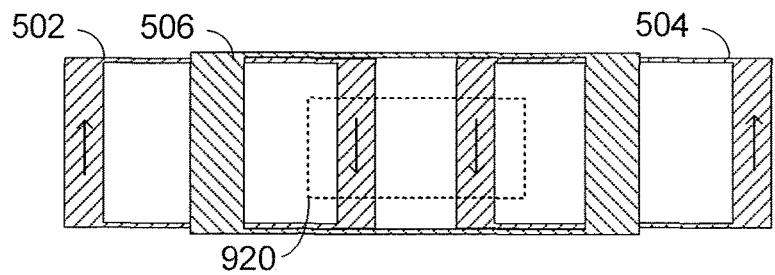
FIG. 9D illustrates an operation of the BAN of FIG. 5 as a vehicle coupler is in a fourth position and moves along the BAN, in accordance with an exemplary implementation.

FIG. 9D shows the vehicle coupler 920 in a fourth position, where the vehicle coupler 920 has advanced and is located over the first and second couplers 502/504 and not the third coupler 506. This fourth position may illustrate another of a plurality of different positions of the vehicle coupler 920 during the "traverse mode" of the BAN 500. When the vehicle coupler 920 is in the fourth position, the first and second couplers 502/504 may be or remain energized with the first AC current having the first polarity as shown by the arrows. The third coupler 506 may switch off. Thus, in the fourth position, as in the first position of FIG. 9A, a horizontal magnetic flux generated by the currents flowing in portions of the first and second couplers 502/504 located under the vehicle coupler 920 in the fourth position are additive for the vehicle coupler 920 at the fourth position.

Figure 9E:
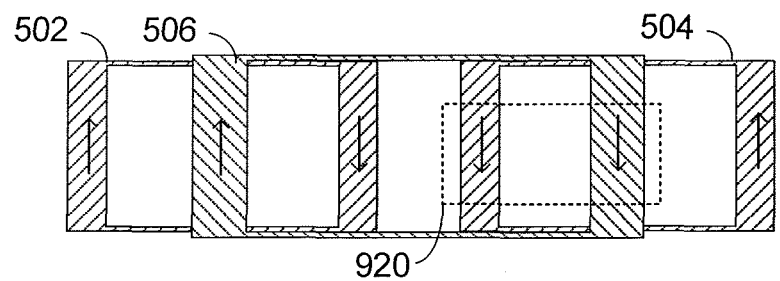
FIG. 9E illustrates an operation of the BAN of FIG. 5 as a vehicle coupler is in a fifth position and moves along the BAN, in accordance with an exemplary implementation.

FIG. 9E shows the vehicle coupler 920 in a fifth position, where the vehicle coupler 920 has advanced and is located over the second and third couplers 504/506. This fifth position may illustrate another of a plurality of different positions of the vehicle coupler 920 during the "traverse mode" of the BAN 500. When the vehicle coupler 920 is in the fifth position, the first and second couplers 502/504 may be or remain energized with the first AC current having the first polarity as shown by the arrows. The third coupler 506 may also be energized with an AC current having the first polarity, as shown by the arrows. Thus, in the fifth position, a current circulating in the second coupler 504 may circulated in an opposite direction as a current circulating in the third coupler 506. In this way, a horizontal magnetic flux generated by the currents circulating in portions of each of the second and third couplers 502/506 located under the vehicle coupler 920 may be additive for the vehicle coupler 920 at the fifth position.

Figure 9F:
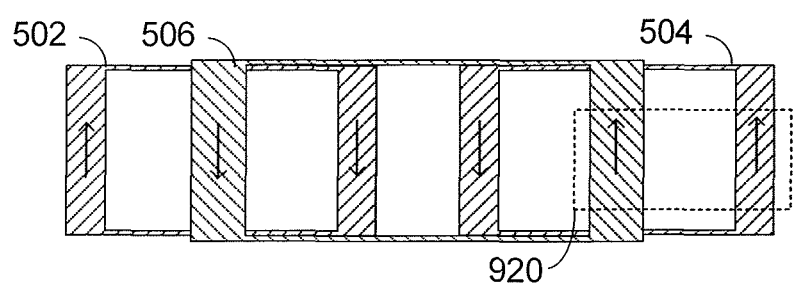
FIG. 9F illustrates an operation of the BAN of FIG. 5 as a vehicle coupler is in a sixth position and moves along the BAN, in accordance with an exemplary implementation.

FIG. 9F shows the vehicle coupler 920 in a sixth position, where the vehicle coupler 920 has advanced and is located over the second and third couplers 504/506. This sixth position may illustrate another of a plurality of different positions of the vehicle coupler 920 during the "traverse mode" of the BAN 500. When the vehicle coupler 920 is in the sixth position, the first and second couplers 502/504 may be or remain energized with the first AC current having the first polarity as shown by the arrows. The third coupler 506 may also be energized with an AC current having the second polarity, as shown by the arrows. Thus, in the sixth position, a current circulating in the second coupler 504 may circulated in a same direction as a current circulating in the third coupler 506. In this way, a horizontal magnetic flux generated by the currents circulating in portions of each of the second and third couplers 502/506 located under the vehicle coupler 920 may be additive for the vehicle coupler 920 at the sixth position.

Figure 9G:
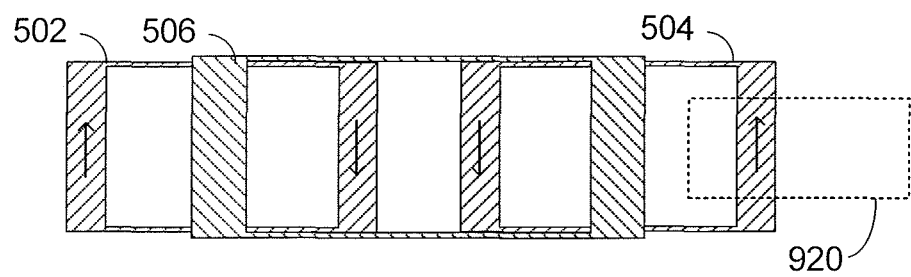
FIG. 9G illustrates an operation of the BAN of FIG. 5 as a vehicle coupler is in a seventh position and moves along the BAN, in accordance with an exemplary implementation.

FIG. 9G shows the vehicle coupler 920 in a seventh position, where the vehicle coupler 920 has advanced and is located over the second coupler 504 and not the third coupler 506. This seventh position may illustrate a position of the vehicle coupler 920 during an "exit mode" of the BAN 500. When the vehicle coupler 920 is in the seventh position, the first and second couplers 502/504 may be or remain energized with the first AC current having the first polarity as shown by the arrows. The third coupler 506 may not be energized since the vehicle coupler 920 is not located over the third coupler 506 in the seventh position.

Although the present application is not so limited, the implementations described in connection with FIG. 9A-9G contemplate that the drive current to the third coupler 506 be turned on, off, or have its polarity reversed based on the position of the vehicle coupler 920 with respect to the BAN 500 or specific ones of the first, second and third couplers 502/504/506 within the BAN 500. The current and phase may remain continuously on or may be activated to the same polarity in each of the first through seventh positions where the vehicle coupler 920 is located over one of the first or second couplers 502/504 of the BAN 500.

Some implementations may utilize a plurality of BANs (e.g., the BANs 500) located one after another in succession along a roadway, for example. In such implementations, where the vehicle coupler 920 is located in the first position (entry position) as shown in FIG. 9A, the vehicle coupler 920 may be simultaneously located in the seventh position (exit position) for an adjacent BAN located immediately before the current BAN with respect to the direction of travel of the coupler 920. Likewise, where the vehicle coupler 920 is located in the seventh position (exit position) as shown in FIG. 9G, the vehicle coupler 920 may be simultaneously located in the first position (entry position) for an adjacent BAN located immediately after the current BAN. In such implementations, the first and second couplers of the preceding adjacent BAN (not shown) may be driven with the first current having the first polarity such that horizontal magnetic flux generated by currents circulating in portions of the first or second couplers of the adjacent BAN may be additive with magnetic flux generated by currents circulating in portions of the second or first couplers, respectively, of the current BAN. For this reason, in such implementations, adjacent BANs or BAN controllers in adjacent BANs may be configured to communicate with one another in order to more efficiently control driving of particular ones of the couplers 502/504/506 for a particular BAN at least partly over which the vehicle coupler 920 may be located.

Figure 10:
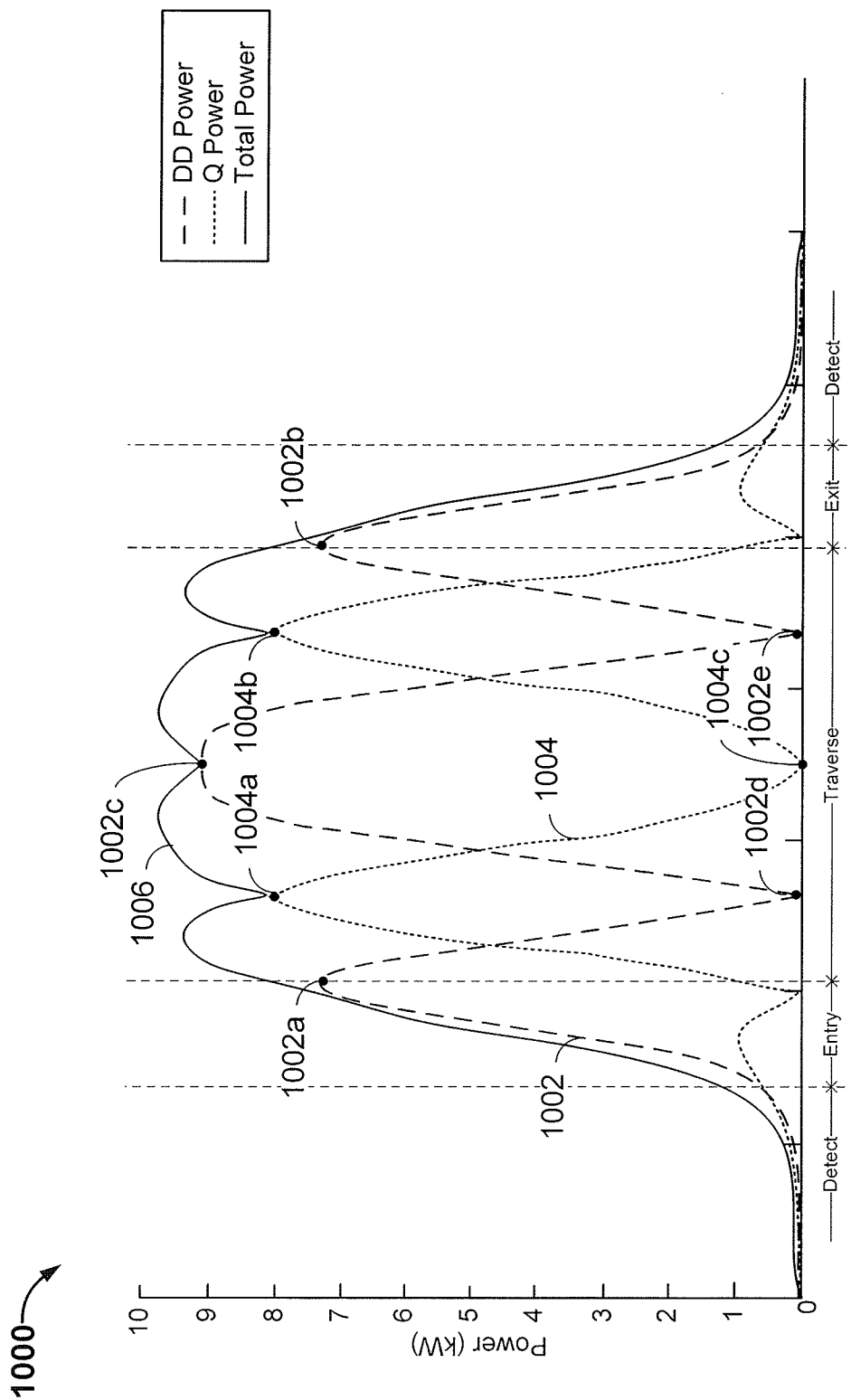
FIG. 10 is a chart showing power transferred versus position of a vehicle coupler for the first and second couplers and/or for the third coupler of the BAN, as previously described in connection with FIG. 5.

FIG. 10 is a chart 1000 showing power transferred versus position of a vehicle coupler for the first and second couplers 502/504 and/or for the third coupler 506 of the BAN 500, as previously described in connection with FIG. 5. FIG. 10 shows three power curves: a first power curve 1002, a second power curve 1004, and a third power curve 1006. The first power curve 1002 shows power transferred by the first and second couplers 502/504 to the vehicle coupler when connected in series anti-phase (in the y-direction) versus an offset of the vehicle coupler with respect to an edge of the BAN 500 nearest the first coupler 502. As shown, the first power curve 1002 is substantially zero at both edges of the offset, comprises two local maximums 1002a/1002b, an absolute maximum 1002c, and two nulls 1002d/1002e between each of the two local maximums 1002a/1002b and the absolute maximum 1002c. The position of the vehicle coupler at the two local maximums 1002a/1002b may correspond substantially to the first and seventh positions of the vehicle coupler 920 shown in FIGS. 9A and 9G, respectively. The position of the vehicle coupler at the absolute maximum 1002c may correspond substantially to the fourth position of the vehicle coupler 920 shown in FIG. 9D. The position of the vehicle coupler at the two nulls 1002d/102e may correspond to a position midway between the second and third positions shown in FIGS. 9B and 9C and to a position midway between the fifth and sixth positions shown in FIGS. 9E and 9F, respectively.

The second power curve 1004 shows a power transferred by the third coupler 506 (in the y-direction) versus the offset of the vehicle coupler. As shown, the second power curve 1004 is substantially zero at both edges of the offset, comprises two local maximums 1004a/1004b, and a null 1004c between the two local maximums 1004a/1004b. The local maximums 1004a/1004b of curve 1004 may occur at substantially the same offsets as the nulls 1002d/1002e of curve 1002 and may correspond to positions of the vehicle coupler midway between the second and third positions shown in FIGS. 9B and 9C and midway between the fifth and sixth positions shown in FIGS. 9E and 9F, respectively.

The third power curve 1006 shows a power transferred by the first, second and third couplers 502/504/506 versus the offset of the vehicle coupler. The third power curve 1006 may simply be the sum of the first and second power curves 1002/1004. When the third coupler 506 is driven at the same time as the first and second couplers 502/504, the nulls 1002d/1002e between the local maximums 1002a/1002b and the absolute maximum 1002c of curve 1002 may be substantially eliminated, and more power may be transferred to the vehicle coupler at substantially every offset position than when only driving the first and second couplers 502/504 (curve 1002).

Figure 11A:
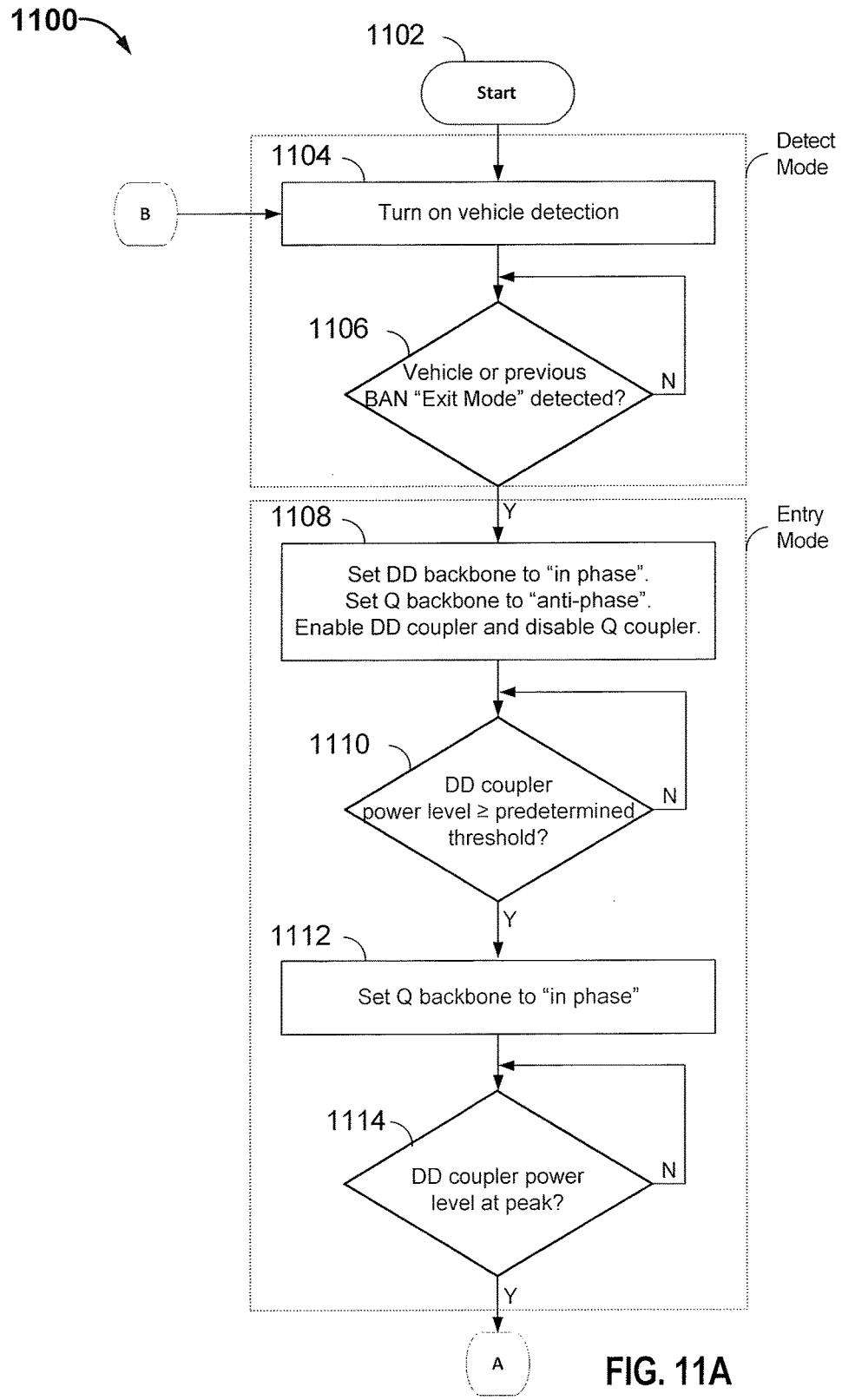
FIG. 11A is a flowchart depicting a method for wirelessly transferring power, in accordance with an exemplary implementation.
Figure 11B:
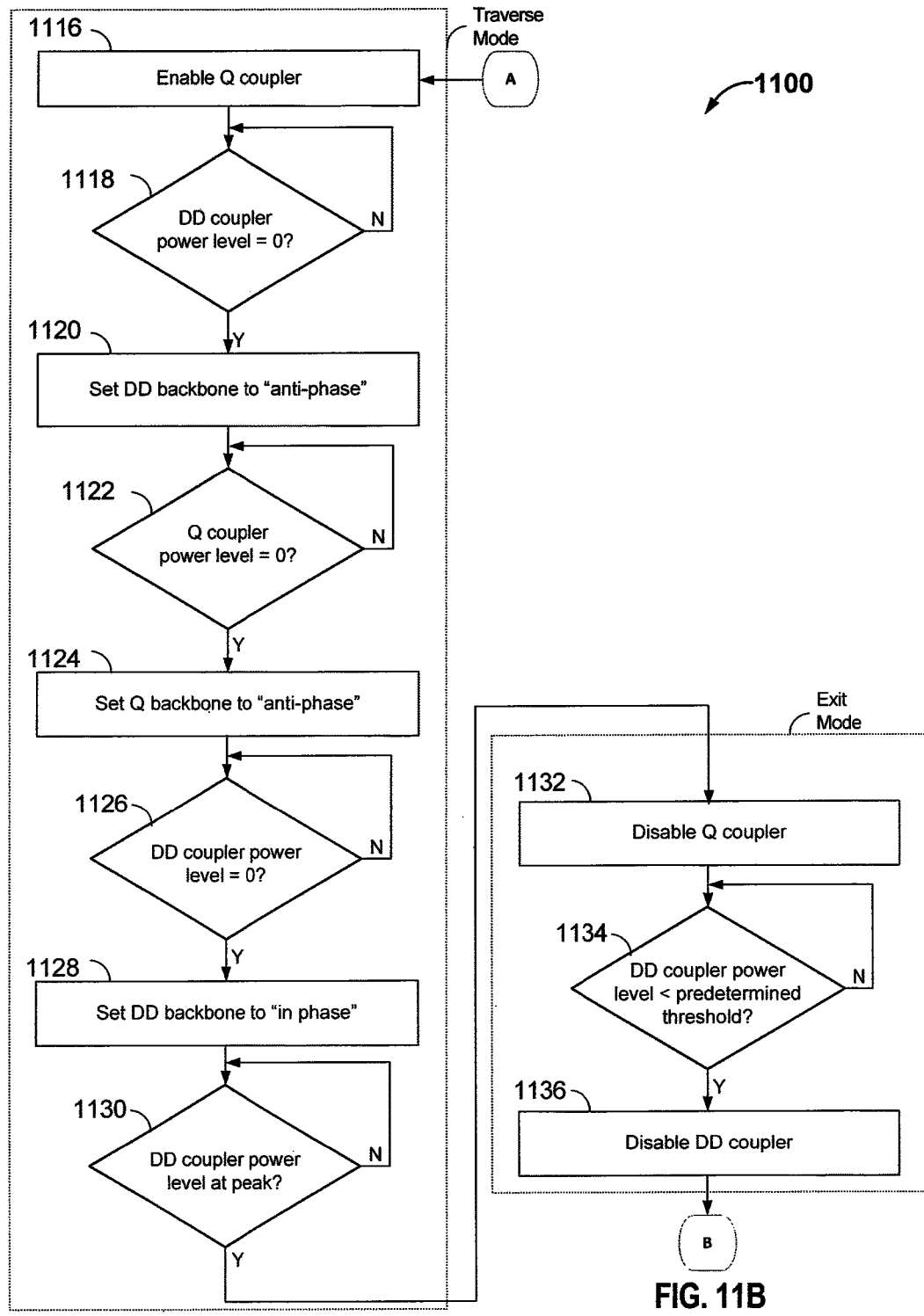
FIG. 11B is a continuation of the flowchart 1100 of FIG. 11A.

FIGS. 11A and 11B may describe an implementation where the polarity of drive currents for the first and second couplers 502/504 as well as the polarity of drive currents for the third coupler 506 may be alternately switched/reversed based on the position of the vehicle coupler 920 and/or based on an amount of power transferred to the first and second couplers 502/504 and/or to the third coupler 506 from one or more AC power backbones. This may be in contrast to implementations as previously described in connection with FIGS. 9A-9G, where the first and second couplers 502/504 are driven with the same phase current so long as the vehicle coupler is located over at least a portion of the BAN 500 (e.g., over at least a portion of the first or second couplers 502/504), and wherein the phase/polarity of the driving current of the third coupler 506 may be switched ON/OFF or reversed based on the location of the vehicle coupler.

FIG. 11A is a flowchart 1100 depicting a method for wirelessly transferring power, in accordance with an exemplary implementation. The flowchart 1100 is described herein with reference to the wireless power transfer BAN as previously described in connection with FIGS. 5-8, and the power transfer chart 1000 of FIG. 10. Drive current polarities and associated exemplary vehicle coupler positions may be described in connection with FIGS. 12A-12G. In an implementation, one or more of the blocks in flowchart 1100 may be performed by a controller, for example, the BAN controllers 650a or 750a/750b and in some implementations, the power flow controllers 610a or 710a/710b, as previously described in connection with FIG. 6 or 7, respectively. Although the flowchart 1100 is described herein with reference to a particular order, in various implementations, blocks herein may be performed in a different order, or omitted, and additional blocks may be added. In some implementations, the flowchart 1100 may apply as the vehicle (e.g., the vehicle 405 of FIG. 4) travels along the roadway 411 having the wireless power transfer system 400 installed therein. For the purposes of FIGS. 11A/11B, reference to a "DD coupler" may correspond to the series anti-phase connected first and second couplers 502/504, while reference to a "Q coupler" may correspond to the third coupler 506, as previously described in connection with FIG. 5.

The flowchart 1100 may begin at "start" block 1102. The flowchart 1100 may then advance to block 1104 where vehicle detection is turned on. Vehicle detection may be carried out based on sensing an amount of power transferred from one or more couplers of the BAN, a voltage or current induced across or in one or more couplers of the BAN, communication with another BAN or BAN controller or any other method by which the presence of a vehicle coupler in the vicinity of the BAN may be reliably detected. Generally at this point, no vehicle coupler is located over any of the first, second or third couplers 502/504/506.

The flowchart 1100 may then advance to block 1106, where the controller (e.g., BAN controllers 650a or 750a/750b and in some implementations, the power flow controllers 610a or 710a/710b) may wait for detection of a vehicle coupler or for detection of an indication of an "exit mode" of an adjacent BAN communicated to the current BAN controller 650a/750a/750b. For example, if an immediately previous and adjacent BAN is in an "exit mode" where a vehicle coupler is moving away from the adjacent BAN, the adjacent BAN or one or more associated BAN controllers may communicate an indication of such a state to the current BAN controller 650a/750a/750b. The portion of the flowchart 1100 comprising blocks 1104 and 1106 may comprise a "detect mode" of the current BAN controller 650a/750a/750b.

Figure 12A:
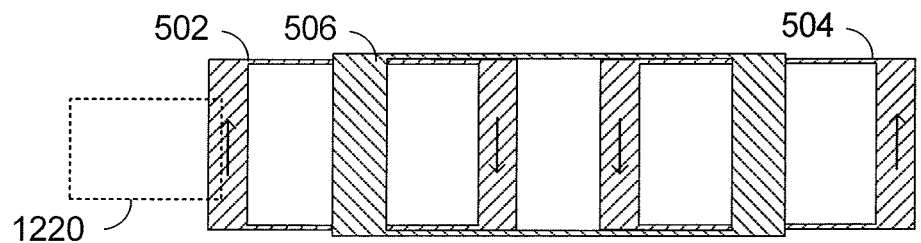
FIG. 12A illustrates an operation of the BAN of FIG. 5 as a vehicle coupler is in a first position and moves along the BAN, in accordance with another exemplary implementation.

Once the "exit mode" indication is received or the presence of the vehicle coupler 1220 is detected, the flowchart 1100 may transition to an "entry mode," which may comprise blocks 1108, 1110, 1112, and 1114. The "entry mode" may correspond to a first vehicle coupler 1220 position shown in FIG. 12A with respect to the first coupler 502, the second coupler 504, and the third coupler 506. At block 1108 the BAN controller 650a/750a/750b may set the DD backbone (e.g., backbone 430a in FIG. 7) to "in-phase," set the Q backbone (e.g., the backbone 430b) to "anti-phase," enable the DD coupler 502/504 and disable the Q coupler 506. For example, the BAN controller 650a/750a/750b may set or adjust or more switches such that the first and second couplers 502/504 are driven with a drive current having a polarity substantially as shown in FIG. 12A, where the third coupler 506 is not yet being driven.

The flowchart 1100 may then advance to block 1110, where the BAN controller 650a/750a/750b may wait for a power transfer level of the DD coupler (i.e., the first and second couplers 502/504) to reach a predetermined threshold. For example, as shown in the power transfer chart 1000 of FIG. 10, such a predetermined threshold may be any power transfer level less than the first local maximum shown in the "Entry" period of the first power curve 1002. Any vehicle coupler 1220 position between those shown in FIGS. 12A and 12B may correspond to such a power transfer level threshold.

Once the BAN controller 650a/750a/750b detects or determines that the predetermined threshold has been reached or exceeded, the flowchart 1100 may advance to block 1112, where the Q backbone 430b phase is switched or set to "in phase." For example, one or more switches in the BAN controller 650a/750b may be adjusted or set such that a drive current of the third coupler 506 (i.e., the Q coupler), when activated, would circulate in the third coupler 506 in the same direction as a current circulating in the first coupler 502 ("in phase"). The third coupler 506 is still not driven at this point.

Figure 12B:
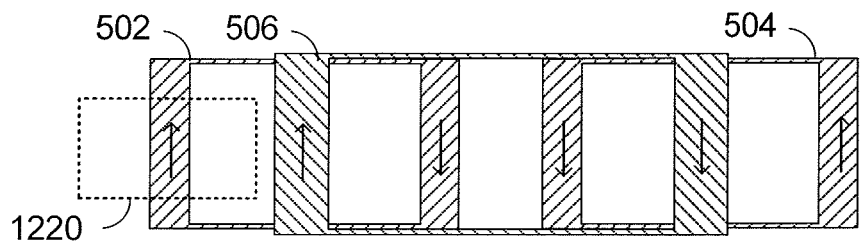
FIG. 12B illustrates an operation of the BAN of FIG. 5 as a vehicle coupler is in a second position and moves along the BAN, in accordance with another exemplary implementation.

The flowchart 1100 may then advance to block 1114, where the BAN controller 650a/750a may wait to detect a peak power transfer in the DD coupler (i.e., in the first and second couplers 502/504). A position of a vehicle coupler 1220 corresponding to this peak power transfer may be the second position of the coupler 1220 as shown in FIG. 12B. Upon such detection, the flowchart 1100 may advance to block "A," and continue as shown in FIG. 11B, which is a continuation of the flowchart 1100 of FIG. 11A.

As shown in FIG. 11B, upon transitioning to block "A," the flowchart 1100 may transition from the "entry mode" to a "traverse mode," which may include blocks 1116, 1118, 1120, 1122, 1124, 1126, 1128 and 1130. At block 1116 the BAN controller 650a/750b may enable the Q coupler (i.e., drive "in phase" current to the third coupler 506 as shown by the arrows in FIG. 12B). The flowchart 1100 may advance to block 1118. It should be noted that as the coupler 1220 moves from the second position shown in FIG. 12B to a third position as will be shown in FIG. 12C, the coupler 1220 is located over a portion of the first coupler 502 and a portion of the third coupler 506. These portions are adjacent to one another and the drive current may circulate in each portion in the same direction (e.g., with the same polarity) such that horizontal magnetic flux from that portion of the first coupler 502 has a same polarity as (e.g., is additive with) a horizontal magnetic flux from the portion of the third coupler 506 as the coupler 1220 moves from the second position to the third position.

Figure 12C:
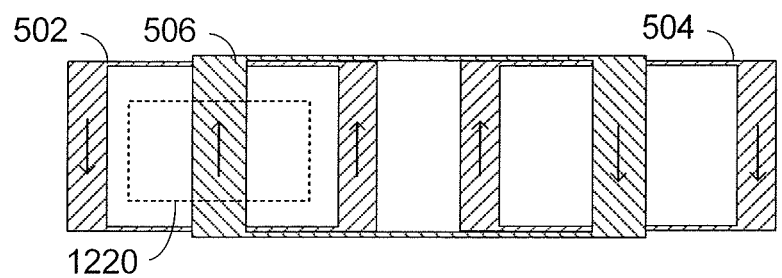
FIG. 12C illustrates an operation of the BAN of FIG. 5 as a vehicle coupler is in a third position and moves along the BAN, in accordance with another exemplary implementation.

At block 1118, the BAN controller 650a/750a may wait for a power transfer level of the DD coupler (i.e., the first and second couplers 502/504) to reach substantially zero. Such a condition may correspond to the first null in power curve 1002 of FIG. 10 and may correspond to a third vehicle coupler 1220 position as shown in FIG. 12C, where the coupler 1220 is located substantially centered over the leftmost portion of the third coupler 506. Upon detecting such a condition, the flowchart 1100 may advance to block 1120, where the BAN controller 650a/750a may set the DD backbone to "anti-phase." For example, the BAN controller 650a/750a may set or adjust one or more switches such that the driving current circulates through the first and second couplers 502/504 in a direction or with a polarity opposite of before the switch, as shown by the arrows in FIG. 12C as compared to FIG. 12B. As the coupler 1220 moves from the third position shown in FIG. 12C to a fourth position as will be shown in FIG. 12D, the coupler 1220 is located over the portion of the third coupler 506 and another portion of the first coupler 502. These portions are also adjacent to one another and the drive current may circulate in each portion in the same direction (e.g., with the same polarity) such that horizontal magnetic flux from that other portion of the first coupler 502 has a same polarity as (e.g., is additive with) a horizontal magnetic flux from the portion of the third coupler 506 as the coupler 1220 moves from the third position to the fourth position.

At block 1122 the BAN controller 650a/750b may wait for a power transfer level of the Q coupler (i.e., the third coupler 506) to reach substantially zero. Such a condition may correspond to a fourth vehicle coupler 1220 position shown in FIG. 12D. It should be noted that, as shown in FIG. 10, this position is also the peak power transfer position for the first and second couplers 502/504 since the vehicle coupler 1220 is now centered over the first and second couplers 502/504. Upon detecting such a condition, the flowchart 1100 may advance to block 1124, where the BAN controller 650a/750b sets the Q backbone 430b to "anti-phase." For example, the BAN controller 650a/750b may set or adjust one or more switches such that a drive current in the third coupler 506 circulates in a direction or with a polarity opposite of before the switch, as shown by the arrows in FIG. 12D as compared to FIG. 12C. At the fourth position, the coupler 1220 is located over the another portion of the first coupler 502 and a portion of the second coupler 504. These portions are adjacent to one another and the drive current may circulate in each portion in the same direction such that horizontal magnetic flux from that another portion of the first coupler 502 has a same polarity as (e.g., is additive with) a horizontal magnetic flux from the portion of the second coupler 504.

Figure 12D:
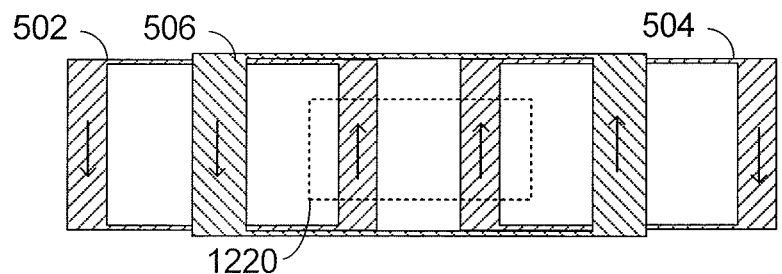
FIG. 12D illustrates an operation of the BAN of FIG. 5 as a vehicle coupler is in a fourth position and moves along the BAN, in accordance with another exemplary implementation.
Figure 12E:
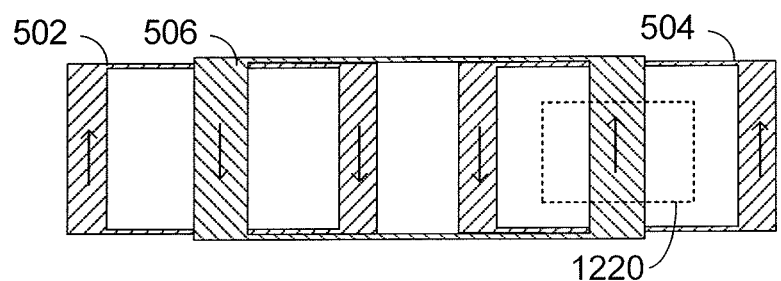
FIG. 12E illustrates an operation of the BAN of FIG. 5 as a vehicle coupler is in a fifth position and moves along the BAN, in accordance with another exemplary implementation.

Moreover, as the coupler 1220 moves from the fourth position shown in FIG. 12D to a fifth position as will be shown in FIG. 12E, the coupler 1220 is located over the portion of the second coupler 504 and another portion of the third coupler 506. These portions are adjacent to one another and the drive current may circulate in each portion in the same direction (e.g., with the same polarity) such that horizontal magnetic flux from that portion of the second coupler 504 has a same polarity as (e.g., is additive with) a horizontal magnetic flux from the another portion of the third coupler 506 as the coupler 1220 moves from the fourth position to the fifth position.

At block 1126 the BAN controller 650a/750a may wait for a power transfer level of the DD coupler (i.e., the first and second couplers 502/504) to reach substantially zero. Such a condition may correspond to the fifth vehicle coupler 1220 position as shown in FIG. 12E. Upon detecting such a condition, the flowchart 1100 may advance to block 1128, where the BAN controller 650a/750a sets the DD backbone to "in phase." For example, the BAN controller 650a/750a may set or adjust one or more switches such that a drive current in the first and second couplers 502/504 circulates in a direction or with a polarity opposite of before the switch, as shown by the arrows in FIG. 12E as compared to FIG. 12D. As the coupler 1220 moves from the fifth position shown in FIG. 12E to a sixth position as will be shown in FIG. 12F, the coupler 1220 is located over the another portion of the third coupler 506 and another portion of the second coupler 504. These portions are adjacent to one another and the drive current may circulate in each portion in the same direction (e.g., with the same polarity) such that horizontal magnetic flux from that another portion of the third coupler 506 has a same polarity as (e.g., is additive with) a horizontal magnetic flux from the another portion of the second coupler 504 as the coupler 1220 moves from the fifth position to the sixth position.

Figure 12F:
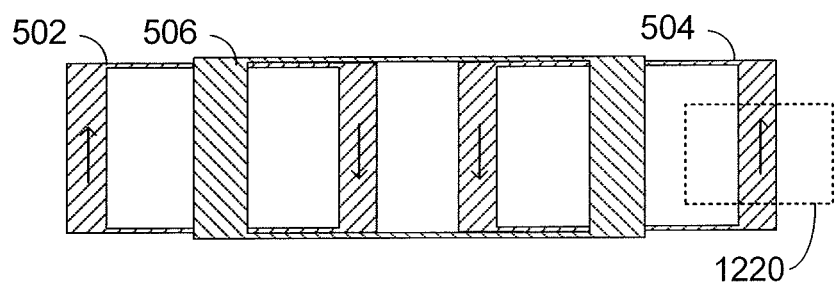
FIG. 12F illustrates an operation of the BAN of FIG. 5 as a vehicle coupler is in a sixth position and moves along the BAN, in accordance with another exemplary implementation.
Figure 12G:
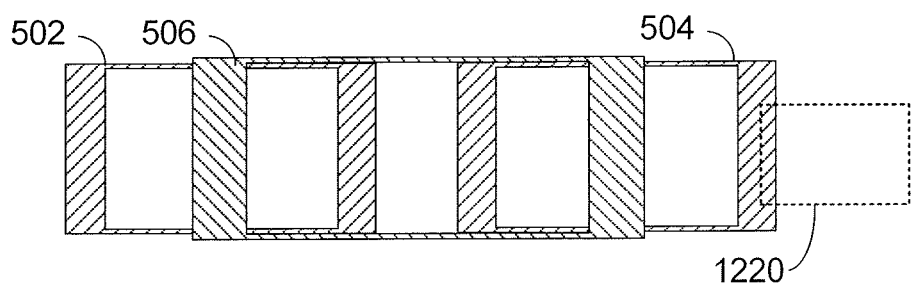
FIG. 12G illustrates an operation of the BAN of FIG. 5 as a vehicle coupler is in a seventh position and moves along the BAN, in accordance with another exemplary implementation.

At block 1130 the BAN controller 650a/750a may wait to detect a peak power transfer level of the DD coupler (i.e., the first and second couplers 502/504). Such a condition may correspond to the second local maximum value of power curve 1002 at the far right side of the traverse period and to the sixth vehicle coupler 1220 position shown in FIG. 12F. Upon detecting such a condition, the flowchart 1100 may transition from the "traverse mode" into an "exit mode" and may advance to block 1132, where the BAN controller 650a/750b may disable the Q coupler (i.e., terminate a drive current to the third coupler 506), as shown in FIG. 12F by the lack of arrows in the third coupler 506.

The flowchart 1100 may then advance to block 1134 where the BAN controller 650a/750a may wait for the power transfer level of the DD coupler (i.e., the first and second couplers 502/504) to fall below the predetermined threshold as previously described in connection with block 1110 of FIG. 11A. Such a condition may correspond to a seventh vehicle coupler 1220 position shown in FIG. 11G. However, any position where the vehicle coupler 1220 is located to the right of the sixth position of FIG. 12F may be adequate. Upon such a condition, the BAN controller 650a/750a may disable a drive current to the DD coupler (i.e., the first and second couplers 502/504), as shown by the lack of arrows in either of the first or second couplers 502/504 in FIG. 12G. The flowchart 1100 may then advance to block "B," which leads back to block 1104 of FIG. 11A in the "detect mode." At this point the vehicle coupler 1220 is likely to no longer be over any of the first, second or third couplers 502/504/506. Although the above implementation shows particular polarities in flowchart 1100 and FIGS. 12A-12G, each of the polarities may be reversed from those described above to achieve the same outcome. In such implementations, each "in phase" may be replaced by "anti-phase" and vice versa.

In yet some other implementations, the first and second couplers 502/504 may be driven mutually exclusively from the third coupler 506 (e.g., the first and second couplers 502/504 are not driven at the same time as the third coupler 506). In such implementations, the series anti-phase connected first and second couplers 502/504 may be driven when the vehicle coupler is located substantially over the first and/or second couplers 502/504 and the third coupler 506 may be driven when the vehicle coupler is located substantially over the third coupler 506. For example, with respect to FIGS. 12A-12G, the first and second couplers 502/504 may be driven when the coupler 1220 is located in any of the first, second, fourth, and sixth positions as previously described in connection with FIGS. 12A, 12B, 12D and 12F, respectively. Contrarily, the third coupler 506 may be driven when the coupler 1220 is located in any of the third or fifth positions as previously described in connection with FIGS. 12C and 12E, respectively. Since the first and second couplers 502/504 are not driven at the same time as the third coupler 506 in such implementations, the relationship between the polarity with which the first and second couplers 502/504 are driven and the polarity with which the third coupler 506 is driven is not as relevant as other previously described implementations.

In yet other implementations utilizing a dual AC power backbone set up, a first AC power backbone may provide power for driving the first and second couplers 502/504 and a second AC power backbone may provide power for driving the third coupler 506. In such implementations, the second AC power backbone may be driven at a phase offset of approximately 90° from the first AC power backbone. In such implementations, the first and second series anti-phase connected couplers 502/504 and the third coupler 506 may be driven as previously described in connection with FIGS. 9A-9G or alternatively as previously described in connection with FIGS. 11 and 12A-12G, of course except that the first AC power backbone and the second AC power backbone, and thus the driving currents for the respective couplers, are offset from one another by 90°.

Figure 13:
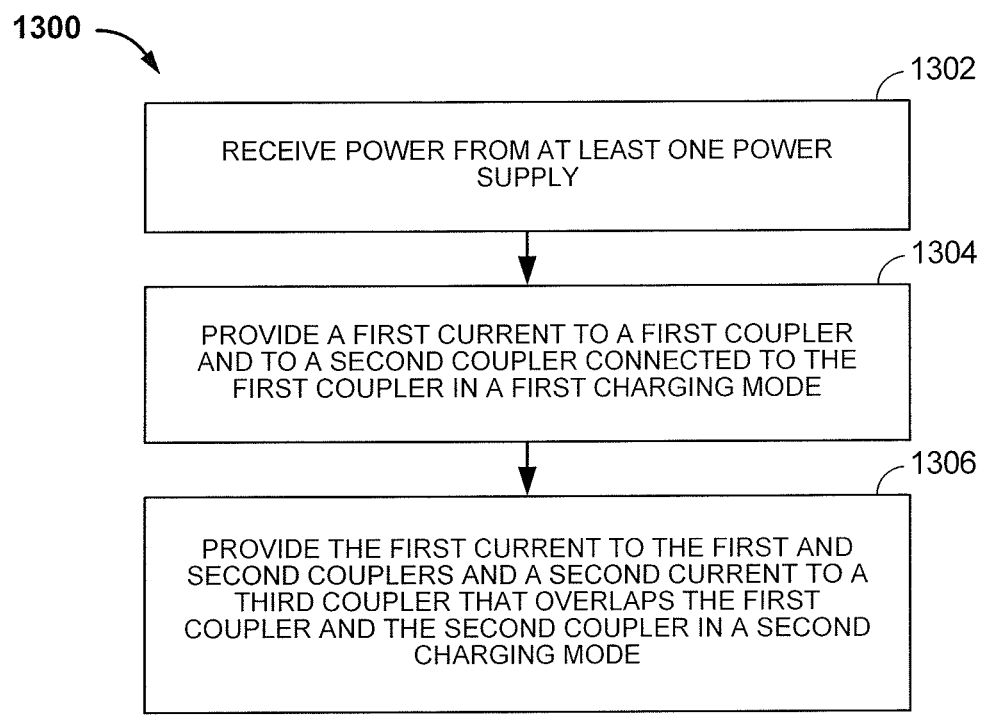
FIG. 13 is a flowchart depicting a method for wirelessly transferring power, in accordance with an exemplary implementation.

FIG. 13 is a flowchart 1300 depicting a method for wirelessly transferring power to a receive coupler, in accordance with an exemplary implementation. The method of flowchart 1300 is described herein with reference to the BAN and BAN controllers as previously described in connection with FIGS. 5-8, 9A-9G and 12A-12G. In an implementation, one or more of the blocks in flowchart 1300 may be performed by a controller such as, for example, one of the BAN controllers 650a/750a/750b and/or the power flow controllers 610a/710a/710b as previously described in connection with FIGS. 6 and 7. Although the method of flowchart 1300 is described herein with reference to a particular order, in various implementations, blocks herein may be performed in a different order, or omitted, and additional blocks may be added. In some implementations, the flowchart 1300 may apply as the vehicle (e.g., the vehicle 405 of FIG. 4) travels along the roadway 413 having the wireless power transfer system 400 installed therein.

The flowchart 1300 may start with block 1302, which includes receiving power from at least one power supply. For example, as previously described in connection with FIG. 6, the BAN controller 650a may wirelessly receive power from the AC power backbone 430 via the coupler 608a. As previously described in connection with FIG. 7, the BAN controllers 750a and 750b may wirelessly receive power from the AC power backbones 430a and 430b, respectively.

The flowchart 1300 may then advance to block 1304, which includes providing a first current to a first coupler and to a second coupler connected to the first coupler in a first charging mode. For example, as shown in FIGS. 6 AND 7, the BAN controller 650a/750a may provide a first current to the first coupler 502 and to the second coupler 504 in a first charging mode.

The flowchart 1300 may then advance to block 1306, which includes providing the first current to the first and second couplers and a second current to a third coupler that overlaps the first coupler and the second coupler in a second charging mode. For example, as shown in FIGS. 6 AND 7, the BAN controller 650a/750a may provide the first current to the first coupler 502 and to the second coupler 504 in the first charging mode. In addition, BAN controller 650a may provide the second current to the third coupler 506 that overlaps the first coupler 502 and the second coupler 504 (see FIG. 5) in a second charging mode. In some implementations, a first portion of the first coupler 502 is disposed adjacent to a second portion of the second coupler 504 and a magnetic flux generated by the first current passing through the first portion of the first coupler 502 is constructively additive with a magnetic flux generated by the first current passing through the second portion of the second coupler 504.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for wirelessly transferring power to a receive coupler, the apparatus comprising:
   a first coupler connected to a second coupler;
   a third coupler overlapping the first coupler and the second coupler; and
   a controller configured to:
      receive power from at least one power supply,
      provide a first current to the first coupler and the second coupler in a first charging mode, wherein a magnetic flux generated by the first current passing through a first portion of the first coupler is constructively additive with a magnetic flux generated by the first current passing through a second portion of the second coupler,
      provide the first current to the first coupler and the second coupler and provide a second current to the third coupler in a second charging mode, and
      reverse a polarity of the second current provided to the third coupler in the second charging mode based on a location of the receive coupler.

2. The apparatus of claim 1, wherein the third coupler is symmetrically positioned over each of the first coupler and the second coupler.

3. The apparatus of claim 1, wherein the controller is further configured to provide the second current having a first polarity in the second charging mode when the receive coupler is located over the second coupler and the third coupler.

4. The apparatus of claim 1, wherein the controller is further configured to provide the second current having a second polarity in the second charging mode when the receive coupler is located over the first coupler and the third coupler.

5. The apparatus of claim 1, wherein the controller is further configured to alternately reverse a polarity of the first current provided to the first and second couplers in the second charging mode based on a location of the receive coupler.

6. The apparatus of claim 5, wherein the controller is further configured to determine the location based on a level of power transferred by the first and second couplers or a level of power transferred by the third coupler.

7. The apparatus of claim 1, wherein the at least one power supply comprises a first power backbone and a second power backbone, the controller further configured to:

receive at least a first portion of the power from the first power backbone for providing the first current to the first coupler and the second coupler, and receive at least a second portion of the power from the second power backbone for providing the second current to the third coupler.

8. The apparatus of claim 1, wherein the controller is further configured to provide the first current 90° out of phase with respect to the second current.

9. A method for wirelessly transferring power to a receive coupler, the method comprising:

receiving power from at least one power supply, providing a first current to a first coupler and to a second coupler connected to the first coupler in a first charging mode, providing the first current to the first and second couplers and a second current to a third coupler that overlaps the first coupler and the second coupler in a second charging mode, and reverse a polarity of the second current provided to the third coupler in the second charging mode based on a location of the receive coupler, wherein a magnetic flux generated by the first current passing through a first portion of the first coupler is constructively additive with a magnetic flux generated by the first current passing through a second portion of the second coupler.

10. The method of claim 9, wherein the third coupler is symmetrically positioned over each of the first coupler and the second coupler.

11. The method of claim 9, further comprising providing the second current having a first polarity in the second charging mode when the receive coupler is located over the second coupler and the third coupler.

12. The method of claim 9, further comprising providing the second current having the second polarity in the second charging mode when the receive coupler is located over the first coupler and the third coupler.

13. The method of claim 9, further comprising alternately reversing a polarity of the first current provided to the first and second couplers in the second charging mode based on a location of the receive coupler.

14. The method of claim 13, further comprising determining the location based on a level of power transferred by the first and second couplers or a level of power transferred by the third coupler.

15. The method of claim 9, wherein receiving power from at least one power supply comprises:

receiving at least a first portion of the power from a first power backbone for providing the first current to the first coupler and the second coupler, and receiving at least a second portion of the power from a second power backbone for providing the second current to the third coupler.

16. The method of claim 9, wherein the first current is 90° out of phase with respect to the second current.

17. A non-transitory computer-readable medium comprising code that, when executed, causes an apparatus to:

receive power from at least one power supply, provide a first current to a first coupler and to a second coupler connected to the first coupler in a first charging mode, provide the first current to the first and second couplers and a second current to a third coupler that overlaps the first coupler and the second coupler in a second charging mode, and reverse a polarity of the second current provided to the third coupler in the second charging mode based on a location of the receive coupler, wherein a magnetic flux generated by the first current passing through a first portion of the first coupler is constructively additive with a magnetic flux generated by the first current passing through a second portion of the second coupler.

18. The medium of claim 17, wherein the third coupler is symmetrically positioned over each of the first coupler and the second coupler.

19. The medium of claim 17, wherein the code, when executed, further causes the apparatus to provide the second current having a first polarity in the second charging mode when the receive coupler is located over the second coupler and the third coupler.

20. The medium of claim 17, wherein the code, when executed, further causes the apparatus to provide the second current having the second polarity in the second charging mode when the receive coupler is located over the first coupler and the third coupler.

21. The medium of claim 17, wherein the code, when executed, further causes the apparatus to alternately reverse a polarity of the first current provided to the first and second couplers in the second charging mode based on a location of the receive coupler.

22. The medium of claim 21, wherein the code, when executed, further causes the apparatus to determine the location based on a level of power transferred by the first and second couplers or a level of power transferred by the third coupler.

23. The medium of claim 17, wherein receiving power from at least one power supply comprises:

receiving at least a first portion of the power from a first power backbone for providing the first current to the first coupler and the second coupler, and receiving at least a second portion of the power from a second power backbone for providing the second current to the third coupler.

24. The medium of claim 17, wherein the first current is 90° out of phase with respect to the second current.

25. An apparatus for wirelessly transferring power to a receive coupler, the apparatus comprising:

first means for wirelessly coupling power to a receive coupler;

second means for wirelessly coupling power to the receive coupler, the second means connected to the first means;

third means for wirelessly coupling power to the receive coupler, the third means overlapping the first means and the second means; and means for providing a first current to the first means and the second means in a first charging mode, wherein a magnetic flux generated by the first current passing through a first portion of the first means is constructively additive with a magnetic flux generated by the first current passing through a second portion of the second means, means for providing the first current to the first means and the second means and for providing a second current to the third means in a second charging mode, and means for reversing a polarity of the second current provided to the third means in the second charging mode based on a location of the receive coupler.

26. The apparatus of claim 25, wherein the third means is symmetrically positioned over each of the first means and the second means.

27. The apparatus of claim 25, wherein the second current has a first polarity in the second charging mode when the receive coupler is located over the second means and the third means.

28. The apparatus of claim 25, wherein the second current has the second polarity in the second charging mode when the receive coupler is located over the first means and the third means.

29. The apparatus of claim 25, wherein the means for reversing is further configured to reverse a polarity of the first current provided to the first and second means in the second charging mode based on a location of the receive coupler.

30. The apparatus of claim 29, further comprising means for determining the location based on a level of power transferred by the first and second means or a level of power transferred by the third means.

* * * * *